United States Patent
Czerniak

(10) Patent No.: US 10,019,541 B2
(45) Date of Patent: Jul. 10, 2018

(54) METHODS FOR ESTIMATING FORMATION PRESSURE

(71) Applicant: GCS Solutions, Inc., The Woodlands, TX (US)

(72) Inventor: Matthew Czerniak, The Woodlands, TX (US)

(73) Assignee: GCS Solutions, Inc., The Woodlands, TX (US)

( * ) Notice: Subject to any disclaimer, the term of this patent is extended or adjusted under 35 U.S.C. 154(b) by 0 days.

(21) Appl. No.: 15/299,389

(22) Filed: Oct. 20, 2016

(65) Prior Publication Data

US 2017/0061049 A1 Mar. 2, 2017

Related U.S. Application Data

(63) Continuation-in-part of application No. 15/255,641, filed on Sep. 2, 2016.

(60) Provisional application No. 62/213,269, filed on Sep. 2, 2015.

(51) Int. Cl.
*G06F 17/50* (2006.01)
*E21B 47/06* (2012.01)
*G06F 17/16* (2006.01)

(52) U.S. Cl.
CPC .......... *G06F 17/5009* (2013.01); *E21B 47/06* (2013.01); *G06F 17/16* (2013.01); *G06F 2217/16* (2013.01)

(58) Field of Classification Search
CPC .. G06F 17/5009; G06F 17/16; G06F 2217/16; E21B 47/06

USPC ............................................................ 703/2
See application file for complete search history.

(56) References Cited

U.S. PATENT DOCUMENTS

| | | | | |
|---|---|---|---|---|
| 3,898,610 A | * | 8/1975 | Pennebaker, Jr. | G01V 1/30 367/33 |
| 4,346,592 A | * | 8/1982 | Fertl | E21B 49/00 73/152.05 |
| 4,981,037 A | * | 1/1991 | Holbrook | E21B 21/08 166/250.07 |
| 5,128,866 A | * | 7/1992 | Weakley | E21B 21/08 367/73 |
| 5,200,929 A | * | 4/1993 | Bowers | G01V 11/00 166/250.07 |
| 5,233,568 A | * | 8/1993 | Kan | E21B 47/06 367/27 |
| 5,282,384 A | * | 2/1994 | Holbrook | E21B 21/08 702/12 |
| 5,615,115 A | * | 3/1997 | Shilling | E21B 47/06 702/12 |

(Continued)

OTHER PUBLICATIONS

Bowers_2001 (Bowers, G.L., Determining an Appropriate Pore-Pressure Estimation Strategy, Offshore Technology Conference OTC 13042, 2001).*

(Continued)

*Primary Examiner* — Brian S Cook
(74) *Attorney, Agent, or Firm* — The Elliott Law Firm PLLC; Douglas H. Elliott

(57) ABSTRACT

One or more specific embodiments includes a method for providing an estimated formation pressure comprising modifying a first data set to derive a second data set that corresponds to estimated pressures wherein modifying the first data set comprises using a variable matrix factor and a compaction coefficient.

2 Claims, 15 Drawing Sheets

(56) References Cited

U.S. PATENT DOCUMENTS

| | | | | |
|---|---|---|---|---|
| 6,195,092 B1* | 2/2001 | Dhond | G06Q 10/10 | 702/6 |
| 6,269,311 B1* | 7/2001 | Berryman | G01V 1/306 | 367/75 |
| 6,351,991 B1* | 3/2002 | Sinha | E21B 49/006 | 367/27 |
| 6,411,902 B1* | 6/2002 | Wiltshire | G01V 11/00 | 702/7 |
| 6,473,696 B1* | 10/2002 | Onyia | G01V 1/32 | 702/14 |
| 6,681,185 B1* | 1/2004 | Young | G01V 1/30 | 367/38 |
| 6,751,558 B2* | 6/2004 | Huffman | G01V 1/284 | 702/14 |
| 9,157,316 B2* | 10/2015 | Wessling | E21B 47/06 | |
| 2004/0008578 A1* | 1/2004 | Leaney | G01V 1/303 | 367/15 |
| 2004/0204855 A1* | 10/2004 | Fleury | G01V 11/00 | 702/6 |
| 2005/0030020 A1* | 2/2005 | Siess | G01V 3/32 | 324/303 |
| 2005/0236184 A1* | 10/2005 | Veeningen | E21B 10/00 | 175/40 |
| 2008/0262737 A1* | 10/2008 | Thigpen | E21B 43/00 | 702/9 |
| 2010/0259415 A1* | 10/2010 | Strachan | E21B 44/00 | 340/853.6 |
| 2011/0208431 A1* | 8/2011 | Skelt | G01V 99/005 | 702/7 |
| 2012/0059633 A1* | 3/2012 | Dutta | G01V 1/303 | 703/2 |
| 2012/0179444 A1* | 7/2012 | Ganguly | E21B 43/26 | 703/10 |
| 2014/0076632 A1* | 3/2014 | Wessling | E21B 21/08 | 175/48 |
| 2014/0149042 A1* | 5/2014 | Zhang | G01V 1/301 | 702/11 |
| 2014/0330542 A1* | 11/2014 | Subramanian | G05B 17/02 | 703/1 |
| 2016/0110812 A1* | 4/2016 | Mun | G06Q 40/06 | 705/36 R |

OTHER PUBLICATIONS

Zhang_2013 (Effective stress, porosity, velocity and abnormal pore pressure prediction accounting for compaction disequilibrium and unloading, Marine and Petroleum Geology 45 (2013) 2-11).*

Chapman_1983 (Developments in Petroleum Science vol. 16, 1983, Petroleum Geology.*

Wyzant_2014 (Basic Rules of Algebra, https://www.wyzant.com/resources/lessons/math/algebra/properties_of_algebra, Feb. 10, 2014 archived on WayBackMachine.).*

Browm_2011 (Fitting Experimental Data, Jul. 2010).*

Methods to Determine Pore Pressure; Petrowiki.org; last modified Jan. 19, 2016; http://petrowiki.org/Methods_to_determine_pore_pressure.

Glenn Bowers; State of the Art in Pore Pressure Estimation; DEA Project 119, Report No. 1; May 25, 1999.

Glenn Bowers; Pore Pressure Estimation from Velocity Data: Accounting for Overpressure Mechanisms Besides Undercompaction; SPE Drilling and Completion; Jun. 1995.

Mark W. Alberty & Michael R. McLean; Emerging Trends in Pressure Prediction; Offshore Technology Conference; 2003.

Glenn Bowers; Determining an Appropriate Pore-Pressure Estimation Strategy; Offshore Technology Conference; 2001.

Jincai Zhang; Pore Pressure Prediction from Well Logs: Methods, Modifications, and New Approaches; Earth-Science Reviews 108 (Jun. 17, 2011) 50-63.

R. W. Lahann & R. E. Swarbrick; Overpressure Generation by Load Transfer Following Shale Framework Weakening due to Smectite Diagenesis; Geofluids (2011) 11, 362-375.

Mark Alberty; Pore Pressure Detection: Moving from an Art to a Science; SPE International Distinguished Lecturer Series; 2004.

Heppard, Philip, and Dan Ebrom; Compaction and Overpressure in Shales: Theory and Practice; Houston Geological Society Dinner meeting; Feb. 22, 2010.

E. Roaldset, He Wei, & S. Grimstad; Smectite to Illite Conversion by Hydrous Pyrolysis; Clay Minerals (1998) 33, 147-158.

Thomas F. Corbet & Craig M. Bethke; Disequilibrium Fluid Pressures and Groundwater Flow in the Western Canada Sedimentary Basin; Journal of Geophysical Research (May 10, 1992) vol. 95, No. B5, pp. 7203-7217.

M.A. Hamouz & S.L. Mueller; Some New Ideas for Well Log Pore-Pressure Prediction; SPE Conference; SPE 13204; 1984.

* cited by examiner

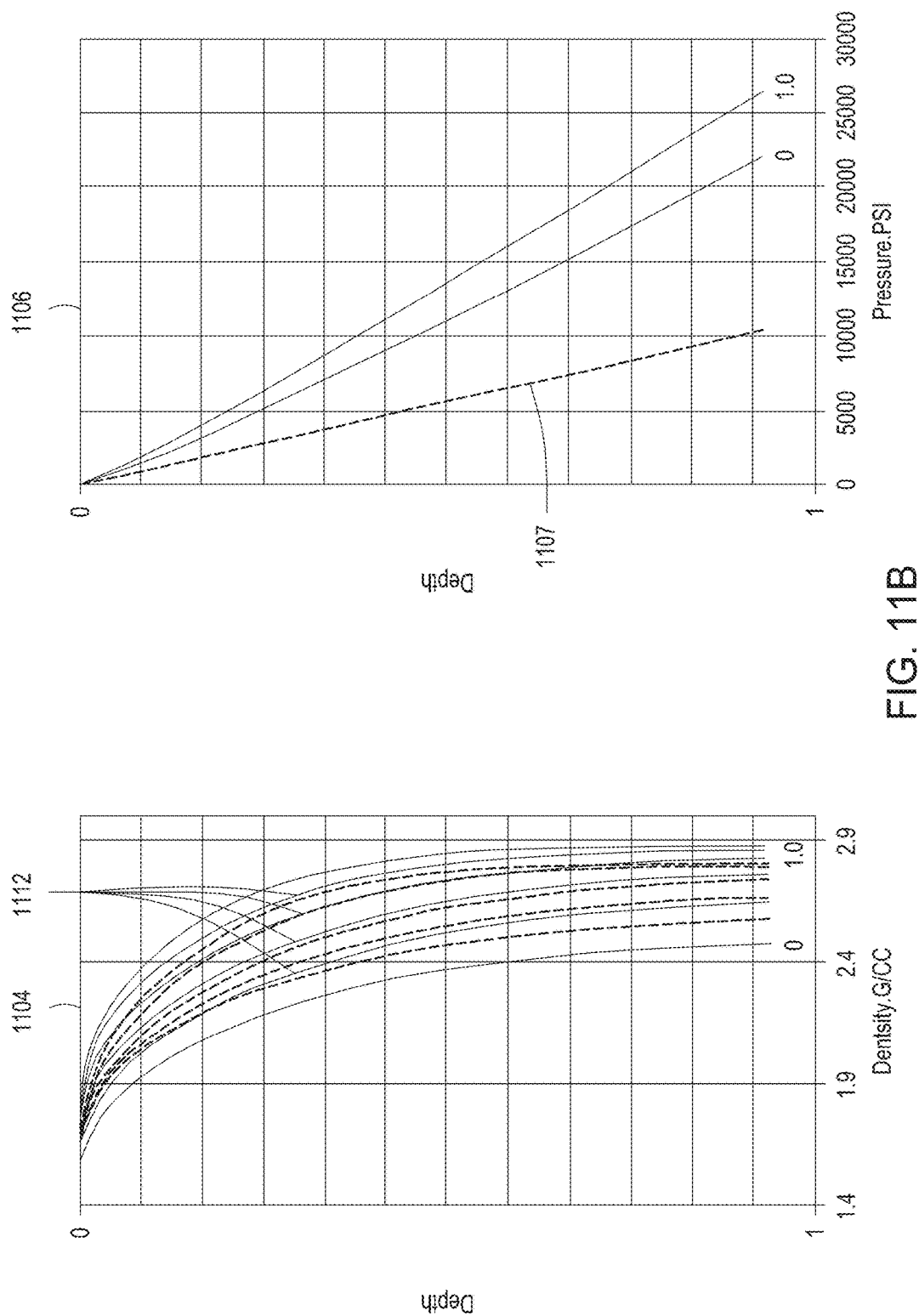

METHODS FOR ESTIMATING FORMATION PRESSURE

RELATED APPLICATIONS

This application is a continuation-in-part of and claims benefit to non-provisional application Ser. No. 15/255,641 filed on Sep. 2, 2016, which claims priority to provisional application No. 62/213,269 filed on Sep. 2, 2015, and hereby incorporates both non-provisional application Ser. No. 15/255,641 and provisional application No. 62/213,269 by reference as if set forth in their entireties.

BACKGROUND

Field of Inventions

The field of this application and any resulting patent relates to formation pressures, particularly for oil and gas wells.

Description of Related Art

Drilling an oil or gas well requires controlling density of the drilling mud so wellbore pressure remains higher than the pore fluid pressure in any formation along the uncased borehole. Otherwise, formation fluid may flow into the wellbore and cause a kick, which can lead to blowouts if inflow is not stopped before the formation fluid reaches the top of the well. Excessive overbalance of the wellbore pressure may also cause problems, such as sticking of the drill pipe, inducing fractures in the borehole wall resulting in drilling fluid loss, and reducing penetration rate of the drill bit. Therefore, operators adjust the mud weight according to the varying pore pressures along the wellbore.

Seismically-derived interval velocities may develop pre-drill pore pressure predictions for oil and gas wells. However, reliability and/or complexity of these predictions impacts drilling performance. Prior velocity transforms to effective stress approaches for the predictions fail to recognize that a single velocity-effective stress relation is not always sufficient. Estimations must take account of compaction, unloading, and differences in formation lattice structures, such as smectite, which is a swelling clay, and illite, which is a non-swelling clay. For example, clay type, clay volume, sediment provenance, formation age, sedimentation rate, and diagenesis may each play a role in altering velocity-effective stress relationships. Existing methods that require calculation of coefficients make predictions difficult and slow, which also limits real-time use when drilling.

Therefore, a need exists for improved systems and methods to provide determinations of pore pressure in formations.

Various methods and systems have been proposed and utilized for determining pore pressure of a formation, including the methods and systems disclosed in the references appearing on the face of this patent. However, these methods and systems lack all the steps and/or features of the methods, systems, and computer-readable media covered by the patent claims below. Furthermore, it is contemplated that the methods, systems, and computer-readable media covered by at least some of the claims of this issued patent solve many of the problems that prior art methods and systems have failed to solve. Also, the methods, systems, and computer-readable media covered by at least some of the claims of this patent have benefits that could be surprising and unexpected to a person of ordinary skill in the art based on the prior art existing as of the filing date of this application.

SUMMARY

One or more specific embodiments herein includes methods for providing an estimated formation pressure comprising modifying a first data set to derive a second data set that corresponds to estimated pressures wherein modifying the first data set comprises using a variable matrix factor and a compaction coefficient.

One or more specific embodiments herein includes methods for providing an estimated formation pressure comprising acquiring a first data set, deriving a minimum set of estimated pressures using at least the first data set, a first multiplier, a first variable matrix factor, and a first compaction coefficient, deriving a maximum set of estimated pressures using the first data set, a second multiplier, a second variable matrix factor, and a second compaction coefficient, deriving a plurality of iterations of estimated pressures using the minimum set of estimated pressures and the maximum set of estimated pressures, and selecting at least one of the iterations of estimated pressures to provide an estimated formation pressure.

One or more specific embodiments herein includes methods for providing an estimated formation pressure comprising acquiring a sonic data set for a well, acquiring a density data set for the well, deriving a first data set from the sonic data set and deriving a second data set from the density data set, wherein the first data set and the second data set each correspond to estimated pressures and wherein deriving the first data set and the second data set comprises: selecting a multiplier, using the multiplier to derive both a variable matrix factor and a compaction coefficient, and using the variable matrix factor and the compaction coefficient to derive the first data set and the second data set, performing a comparison of the first data set and the second data set, and determining the estimated pressure for one or more depths that corresponds to the actual pressure at those depths based at least in part on the comparison of the first data set and the second data set.

One or more specific embodiments herein includes a non-transient computer readable storage medium containing program instructions for causing a computer to perform a method for providing an estimated formation pressure comprising: modifying a first data set to derive a second data set that corresponds to estimated pressures wherein modifying the first data set comprises using a variable matrix factor and a compaction coefficient.

For one embodiment, a method of determining pore pressure includes acquiring sonic log data and density log data in a well. The method includes transforming the electric log data to compressional sonic velocity and rhob density derived pressures for first and second formation types. Shifting the velocity and density derived pressures while tethered together through iterations between a first state representative of the first formation type and a second state representative of the second formation type enables selecting the pore pressure based on convergence of the velocity and density derived pressures.

In one embodiment, a system for determining pore pressure includes sonic and density logging tools. A computer couples to receive sonic and density log data output from the tools and implements a program to determine the pore pressure. The program transforms the data to velocity and density derived pressures for first and second formation types and shifts the velocity and density derived pressures while tethered together through iterations between a first state representative of the first formation type and a second state representative of the second formation type in order to display the pore pressure based on convergence of the velocity and density derived pressures.

Methods and systems determine pore fluid pressure of a formation through which a well traverses for recovery of hydrocarbons. Sonic and density logging tools acquire data transformed by an algorithm to compaction trends representative of different formation types, such as smectite and illite. Pairing such velocity-depth compaction trends and iteratively solving using known porosity trends for the formation types derives a velocity-effective stress trend, which enables direct calculation of the pore fluid pressure. The pore fluid pressure determination may provide correlations for nearby proposed wells or real-time measurements for selecting mud weight while drilling the well.

One or more specific embodiments herein includes methods, systems, or CRM for providing an estimated formation pressure may comprise acquiring a first data set, acquiring a second data set, providing a lower density-velocity trend and an upper density-velocity trend, calculating a delimiter density-velocity trend using a delimiter multiplier, the lower density-velocity trend, and the upper density-velocity trend, wherein the first density velocity trend may be between the lower density-velocity trend and an upper density-velocity trend; receiving a first multiplier and deriving a first density-velocity trend; and calculating estimated pressures using the first density-velocity trend, the first data set, and the second data set; wherein, if the first multiplier is less than the delimiter multiplier, deriving the first density-velocity trend may comprise calculating the first density-velocity trend using the first multiplier, the lower density-velocity trend, and the upper density-velocity trend; and if the first multiplier is equal to or greater than the delimiter multiplier, deriving the first density-velocity trend may comprise calculating the first density-velocity trend using the delimiter multiplier, the lower density-velocity trend, and the upper density-velocity trend.

One or more specific embodiments herein includes methods for providing an estimated formation pressure including acquiring a sonic data set for a well; acquiring a density data set for the well; deriving a first data set from the sonic data set and deriving a second data set from the density data set, wherein the first data set and the second data set each correspond to estimated pressures and wherein deriving the first data set and the second data set comprises: selecting a first multiplier and a second multiplier, wherein the second multiplier is not derived from the first multiplier; using the first multiplier or the second multiplier to derive a velocity compaction trend comprising a variable matrix factor and a compaction coefficient; and using the velocity compaction trend and a sonic-density trend to derive the first data set and the second data set; wherein the sonic-density trend is determined by the first multiplier if the first multiplier is below the second multiplier; and wherein the sonic-density trend is determined by the second multiplier if the first multiplier is greater than or equal to the second multiplier.

BRIEF DESCRIPTION OF THE DRAWINGS

FIGS. 11A-11C depict a generation of a number of derived curves and cross-plots using an untethered method, according to one or more specific embodiments of the inventions.

DETAILED DESCRIPTION

1. Introduction

Figure 1:
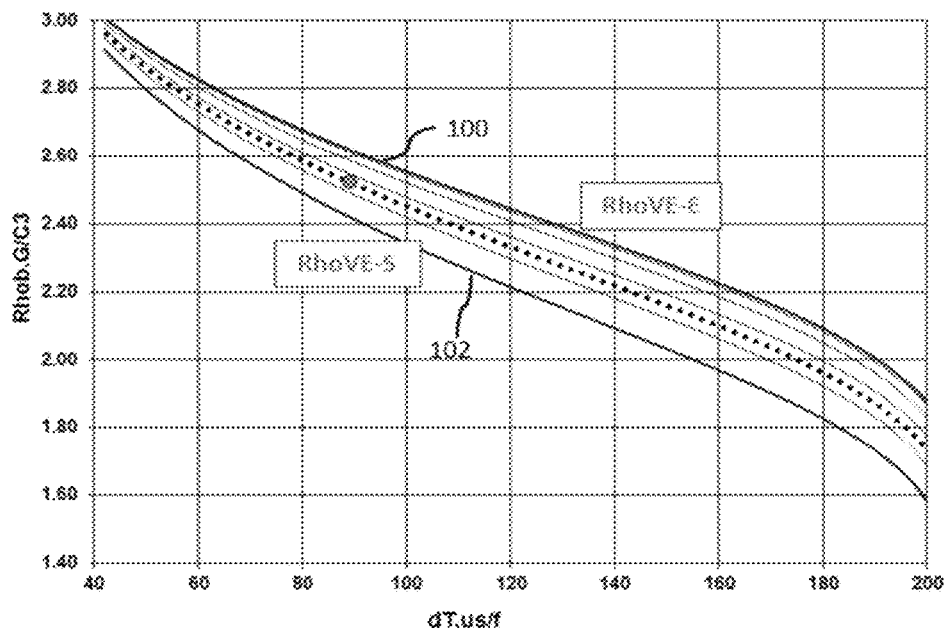
FIG. 1 depicts a velocity-density cross-plot with a first curve (RhoVE-S) and second curve (RhoVE-$\epsilon$), according to one or more specific embodiments of the inventions.

A detailed description will now be provided. The purpose of this detailed description, which includes the drawings, is to satisfy the statutory requirements of 35 U.S.C. § 112. For example, the detailed description includes a description of the inventions and sufficient information that would enable a person having ordinary skill in the art to make and use the inventions defined by the claims. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in printed publications, dictionaries, or issued patents.

2. Selected Definitions

Certain claims include one or more of the following terms which, as used herein, are expressly defined below. Some specific embodiments disclose a method comprising a two-parameter (a, α) approach that may produce a catalog of model-driven, "virtual" rock properties that in turn may produce estimated pore pressures when applied to measured density or sonic values. The term "virtual" is used to clarify the separation between the stand-alone catalog of rock properties produced by one or more specific embodiments and any actual well data being assessed. The depth parameters for the RhoVE series are also considered "virtual" with respect to any calculations being performed and independent from any offset well being analyzed.

It will be apparent that the various terms identified and/or defined below may be embodied in methods, systems, or non-transient, computer-readable media (CRM), e.g., as part of a set of machine-readable instructions (object code) residing in some type of computer hardware, e.g., processor or memory. The various ways to use the items represented by the terms discussed below, and to implement the equations, calculations, and algorithms described herein, will be known or can otherwise be determined by persons skilled in the art of computer programming, particularly those who are familiar with writing computer programs for estimating pore pressures or other properties of downhole formations in general based on the disclosure of this patent application and issued patent, including the algorithms disclosed herein. Also, the items discussed below, including those in the various equations disclosed herein, may be implemented in a variety of different types of computer programs using any one of a number of different programming languages, and the methods, systems, and CRM are not limited to any particular computer program or programming language.

The term "pressure" as used herein is defined as force applied to, on, or against anything, e.g., an object. In certain embodiments described herein, pressure may be quantified, e.g., determined (e.g., using calculations) or measured. A fluid may exert pressure against an object or a surface, for example, when the fluid is confined in a container having a fixed volume. Thus, as applied to certain embodiments described herein, hydrocarbons in a formation may be confined in pores in the formation, and the hydrocarbons exert pressure within that pore. The pressure in the pore may be released during a hydrocarbon recovery operation. This released pressure, which may sometimes be measured, is sometimes referred to as the pore pressure of or for that formation, and may also be referred to as the formation pressure or pore pressure. The term pressure as used herein may in some cases refer to pressure at a particular depth, and in other cases may refer to a pressure gradient, e.g., at some downhole location. Certain pressures are estimated pressures, which may in some cases refer to formation pressures that are determined, e.g., calculated by a computer program and/or by a user. As used herein, the term "estimated pressure" is different from an "actual pressure", the latter being a measured quantity, e.g., resulting from pressure measurements taken downhole. It will be appreciated, of course, that no measurement is perfect, but as used herein any measured quantity, such as pressure, density, or velocity, will be regarded as the actual quantity. In the context of certain methods, systems, and CRM described herein, the "pressure" that is determined, e.g., calculated, may take the form of a value that can be determined by the instructions of a computer program or and an electronic value that can be stored in computer memory.

The term "multiplier" as used herein is defined as a number, group of numbers, or equation by which something else, e.g., a number or equation, is multiplied. Thus, in a general sense, a multiplier may be applied to another number to yield a numerical result. A multiplier may be applied to a curve, or other mathematical relationship. A multiplier is preferably a unit-less number, although not necessarily. A multiplier may be applied to a data set in which case each of the points in the data set may be affected by the multiplier. More than one multiplier may be used in a particular method for estimating pore pressure. When two or more multipliers are used, the first multiplier may or may not be the same as the second multiplier, but preferably, the first multiplier is different from the second multiplier. A multiplier may range from 0.0 to 1.0. For example, a multiplier may range from 0.1, 0.2, 0.25 0.3, 0.33, 0.4, or 0.5, to 0.55, 0.60, 0.65, 0.70, 0.75, 0.80, or 0.90. Alternatively, a multiplier may exceed 1.0; for example, a multiplier may range from 1.1, 1.2, 1.25, 1.3, 1.4, 1.5 or 1.75 to 1.25, 1.3, 1.4, 1.5, 1.75, 1.8, 1.9, 2.0, 3.0, or 4.0. A multiplier may be modified using an algorithm to produce another multiplier. For example, as discussed below, the multiplier α may be modified using the equation $a=\gamma\alpha-\alpha^{\gamma}$ to produce the multiplier a. The multiplier α may be used to calculate the multiplier a using any number of different algorithms or equations. In the context of certain methods, systems, and CRM described herein, the "multiplier" that is used, whether provided or determined, e.g., calculated by the method, system, or CRM, may take the form of a value that is part of the instructions of a computer program and also can be an electronic value stored in computer memory. When a delimiter is utilized, the multiplier a may be capped at a certain value that may be determined by a user and/or the program. In this case, the calculations of the estimated pressures may be performed using multiple α multipliers and the single α multiplier (the delimiter) once the delimiter value for a is reached.

The term "data set" as used herein is defined as a collection of information, preferably related information that is or is capable of being electronically or magnetically stored, e.g., in computer memory. For example, a series of density measurements at various depths downhole may be referred to herein as a density data set. Also, for example, a series of sonic or velocity measurements may be referred to herein as either a sonic data set or a velocity data set. A series of pressure measurements or pressure estimates may be referred to herein as a pressure data set. Also, one or more recorded observations of various well events (e.g., stuck pipe, kick) may be referred to herein as a data set. In accordance with certain specific embodiments described herein, a first data set may be modified to derive a second data set, e.g., when or after the first data set is transformed into the second data set using an algorithm. Similarly, a second data set may be derived from a first data set if the first data set influences or affects the determination of the second data. A first data set may or may not be recorded or stored separately from a second data set, e.g., a first data set may be converted to a second data set, in which case the second data set may be stored in memory, e.g., in the same memory where the first data set was previously stored and not recorded or stored separately in a separate location in memory. Two data sets may be compared to one another, preferably when they include the same type of data. For example, a first data set may be compared to a second data set if the first data set includes information that is of the same type as the second data set (e.g., pressure data sets). For example, a first data set may be compared to a second data set when points in the second data set correspond to information that is of the same type as the first data set (e.g., well events may correspond to pressure data).

The terms "minimum set" and "maximum set" as used herein refer to data sets with respect to one another. The minimum set preferably contains information that is different than the maximum set. Preferably, the minimum set contains information that is derived from a first multiplier that is numerically lower than the multiplier used in deriving the maximum set. For example, a maximum set of estimated pressures may include pressure values that are higher than pressure values in a minimum set at the same depths in the maximum set. In the context of certain methods, systems, or CRM described herein, the "data set" that is used, whether provided or determined, e.g., calculated, may take the form of a value that is part of the instructions of a computer program, and also can be an electronic value stored in computer memory or on some CRM.

The term "derive" as used herein is defined as determine, preferably by using other data, calculations, or methods. Preferably, something that is derived is or was determined using an existing, known, or selected equation, data, number, or method. Either a factor, a coefficient, or both, may be derived from a multiplier, particularly if the multiplier or some other factor derived from the multiplier is used to calculate the factor or coefficient. For example, the multiplier a may be used to derive the variable matrix factor using the equations $\Delta t_i = \varphi_i(\Delta t_{ml} - \Delta t_{mx}) + \Delta t_{mx}$ and $\varphi_i = -22.7427(\alpha)^3 + 59.2148(\alpha)^2 - 52.6646(\alpha) + 16.294$. Also, for example, the multiplier $\alpha$ may be used to derive the compaction coefficient using the equation $c = 0.000148393(\alpha)^2 - 0.00000376465(\alpha) + 0.000158341$. In the context of certain methods, systems, or CRM described herein, any manner of "deriving" may be performed as part of the instructions of a computer program, and such instructions may also be part of electronic values stored in computer memory or on some CRM.

The term "variable matrix factor" as used herein is defined as a numerical term, preferably one that represents travel time of a sound wave through a matrix, e.g., an underground formation or portion thereof, and is capable of being varied to account for changes in matrix properties. A variable matrix factor may be used to determine a velocity compaction trend by accounting for a non-zero lower limit of the porosity of a type of formation. A variable matrix factor ($\Delta t_i$) may be a number that is used in another formula to determine a value or relationship. For example, in certain specific embodiments, a variable matrix factor ($\Delta t_i$) can be used as a variable in a formula to calculate a velocity normal compaction trend for a specific type of formation. Also, a variable matrix factor ($\Delta t_i$) can itself be calculated using other quantities. In certain specific embodiments, a variable matrix factor ($\Delta t_i$) may be derived using the equations $\Delta t_i = \varphi_i(\Delta t_{ml} - \Delta t_{mx}) + \Delta t_{mx}$ and $\varphi_i = -22.7427(\alpha)^3 + 59.2148(\alpha)^2 - 52.6646(\alpha) + 16.294$. A variable matrix factor may be used to account for changes in compaction, density, porosity, pressure, composition, etc. at different depths of a formation or in different formations. A variable matrix factor may be added to an equation related to a velocity compaction trend. A multiplier (e.g., $\alpha$) may be used to determine a variable matrix factor. In the context of certain methods, systems, or CRM described herein, a "variable matrix factor" that is used, whether provided or determined, e.g., calculated, may take the form of a value that is part of the instructions of a computer program, and also can be an electronic value stored in computer memory or on some CRM.

The term "compaction coefficient" as used herein is defined as a numerical term that accounts for changes in compaction or other related matrix properties (e.g., porosity, velocity, density) as a function of depth and/or formation type. A compaction coefficient may be used to calculate or determine a velocity compaction trend. A compaction coefficient may be a number that is used in another formula to determine a value or relationship. A compaction coefficient (c) may be derived using the equation: $c = 0.000148393(\alpha)^2 - 0.00000376465(\alpha) + 0.000158341$. A compaction coefficient may correspond to changes in formation properties, e.g., compaction, density, porosity, pressure, composition, in different portions of a formation or different formations. A multiplier ($\alpha$) may be used to determine a compaction coefficient. The same multiplier may be used in determining both a compaction coefficient and a variable matrix factor. In the context of certain methods, systems, or CRM described herein, the "compaction coefficient" that is used, whether provided or determined, e.g., calculated, may take the form of a value that is part of the instructions of a computer program, and also can be an electronic value stored in computer memory or on some CRM.

The term "acquiring" as used herein is defined broadly as obtaining, receiving, or collecting. For example, a data set may be acquired when measurement tools locate downhole log data (e.g., density data) and send the data to a computer accessible by a user. A data set may be considered acquired when a previously collected set of downhole data from a separate well is received by the system. In the context of certain methods, systems, or CRM described herein, any manner of "acquiring" may be performed as part of the instructions of a computer program, and such instructions may also be part of electronic values stored in computer memory or on some CRM.

The term "iteration" as used herein is defined as one of a group; an instance. One example of an iteration is a second data set that is derived, e.g., calculated, from a first data set using an algorithm, e.g., an equation or other set of programming instructions. Multiple iterations may be derived from one or more data sets when an algorithm is used to determine each iteration and at least one factor in the algorithm changes between iterations. In the context of certain methods, systems, or CRM described herein, the iteration that is used, whether provided or determined, e.g., calculated, may take the form of a value that is part of the instructions of a computer program, and also can be an electronic value stored in computer memory or on some CRM.

In some instances, the term "determine" as used herein is defined as produce, preferably by calculation. In some instances, the term "determine" as used herein is defined as choose, select. Determining which iteration best corresponds to a data set may comprise evaluating or comparing various information to make a conclusion regarding one or more iterations. Determining a data set may comprise deriving a second data set from a first data set using a calculation. In the context of certain methods, systems, or CRMs described herein, any manner of "determining" or "calculating" may be performed as part of the instructions of a computer program, and such instructions may also be part of electronic values stored in computer memory or on some CRM.

The term "sonic" as used herein is defined as related to travel time of sound through a substance. Thus, for example, sonic data may be a time duration that it takes a particular sound wave to travel a particular distance interval. Velocity data may be the speed at which a particular sound wave travels through a substance, as measured in a distance interval traveled over a time duration. In some instances in this patent, the term "velocity" may be used interchangeably with the term "sonic" in which case velocity data may be converted to sonic data by taking the quotient of $10^6$ divided by the velocity data point. In the context of certain methods, systems, and CRM described herein, any "sonic" data or value that is used, whether provided or determined, e.g., calculated, may take the form of a value that is part of the instructions of a computer program, and also can be an electronic value stored in computer memory or on some CRM.

The term "density" as used herein is defined as quantity per unit, e.g., weight in a particular volume. Density data may comprise measurements of weight per volume. Density information may relate to, be proportionate with, indicate, or corresponding to pressure information. Density data may be used to produce or be modified to become pressure data using an algorithm. Density of a formation may vary with respect to depth. In the context of certain methods, systems, and CRM described herein, any "density" data or value that is used, whether provided or determined, e.g., calculated, may take the form of a value that is part of the instructions of a computer program, and also can be an electronic value stored in computer memory or on some CRM.

The term "select" as used herein is defined as choose, e.g., from a plurality (more than one) option, and may be performed by a human being or by a computer. For example, multiplier may be selected by a human being. A multiplier may be selected by a computer program, which may be operated by the human being. A multiplier may be manually selected. A multiplier may be automatically selected, e.g., by a computer program that includes pre-programmed selection criteria. In the context of certain methods, systems, or CRM described herein, any manner of "selecting" may be performed as part of the instructions of a computer program, and such instructions may also be part of electronic values stored in computer memory or on some CRM.

The term "compare" as used herein is defined as evaluate two or more objects with respect to one another. The term "comparison" as used herein is defined as evaluation. For example, a comparison may comprise observations made from the act of comparing multiple objects. In the context of certain methods, systems, or CRM described herein, any manner of "comparing" may be performed as part of the instructions of a computer program, and such instructions may also be part of electronic values stored in computer memory or on some CRM.

The term "depth" as used herein is defined as distance from some point to a surface, e.g., a distance from a point in the wellbore to some point on a surface where the imaginary line between the two points extends and intersects the center of the earth at least approximately. A depth may be a measured quantity, or an estimated quantity. Depths may be measured from any number of surfaces, e.g., sea level or mud line. A range of depths may include a number of different measurements, for example, from 1000 ft. to 2000 ft. In some instances, a range of depths may include a single measurement, e.g., 1000 ft. Density data and velocity data may be collected with respect to depth. In the context of certain methods, systems, and CRM described herein, any "depth" that is used, whether provided or determined, e.g., calculated, may take the form of a value that is part of the instructions of a computer program, and also can be an electronic value stored in computer memory or on some CRM.

The term "based on" as used herein is defined as the state of one thing that originates from another thing, or that owes its existence to something else; e.g., derived from, depending on, or determined by. For example, if an estimate is based at least in part on a comparison, then the observations or results of the comparison may influence the estimate.

The term "trend" as used herein is defined as a relationship between two or more values, properties, or characteristics, and may be represented graphically as exemplified in some of the drawings herein. A trend may correspond to one or more equations relating two or more variables to one another. For example, a density-velocity trend may comprise an equation comprising two variables that correspond to density and velocity. In the context of certain methods, systems, and CRM described herein, any "trend" that is used, whether provided or determined, e.g., calculated, may take the form of a value that is part of the instructions of a computer program, and also can be an electronic value stored in computer memory or on some CRM.

The term "compaction trend" as used herein is defined as a trend in which at least one of the values, properties, or characteristics is depth. In one or more specific embodiments, another of the values, properties, or characteristics may be density or velocity. The concept of a compaction trend is based on the recognition that the deeper one goes in a formation, the more overburden rock is present, which presses downward on the rock at that particular depth, and creates compaction pressure. Thus, generally speaking, certain properties at a particular depth are influenced by the compaction caused by the overburden rock. In the context of certain methods, systems, and CRM described herein, any "compaction trend" that is used, whether provided or determined, e.g., calculated, may take the form of a value that is part of the instructions of a computer program, and also can be an electronic value stored in computer memory or on some CRM.

The term "equation" as used herein is defined as a statement that two expressions are equal, preferably mathematically equal, where at least one of the expressions includes a variable that one is trying to determine, e.g., solve. Generally, as used herein, the left side of the equations discussed herein are the variables that one is trying to determine, using the right side of the equation. Multiple equations sharing a single factor may be combined into a single equation by manipulating the equations to substitute the factor into one equation. An example of an equation is $\Delta t_i = \varphi_i (\Delta t_{ml} - \Delta t_{mx}) + \Delta t_{mx}$. Another example of an equation is $\varphi_i = -22.7427(\alpha)^3 + 59.2148(\alpha)^2 - 52.6646(\alpha) + 16.294$. In the context of certain methods, systems, and CRM described herein, any "equation" that is used, whether provided or determined, e.g., calculated, may take the form of a value that is part of the instructions of a computer program, and also can be an electronic value stored in computer memory or on some CRM.

The term "correspond to" as used herein is defined broadly as relate to or associate with, e.g., be similar, analogous, or equivalent to. A data set that corresponds to pressures may comprise pressure data. A data set of pressures may best correspond to another data set when at least a portion of the two data sets overlie, or are approximately equal to one another. A data set of pressures may best correspond to another data set when a user determines the comparison of the two data sets provides useful information. Estimated pressure may correspond to actual pressures when one or more indicators or measurements of pressure support the conclusion that the estimated pressure is close or equal to the actual pressure. A first object that does not correspond to a second object is preferably not identical to the second object.

The term "modify" as used herein is defined as change, either somewhat or drastically, e.g., the form, amount, or quality of something. In the context of certain methods, systems, or CRM described herein, any manner of "modifying" may be performed as part of the instructions of a computer program, and such instructions may also be part of electronic values stored in computer memory or on some CRM.

The term "tethered" as used herein is defined as connected or joined. Two sets of estimated pressures may be tethered if they are each modified using at least one variable that is the same. Two sets of estimated pressures that are tethered together need not be modified simultaneously using at least one variable that is the same, but are preferably modified using at least one variable that is the same before being modified by another variable that is different from the first variable. Two sets of estimated pressures that are not tethered together may be determined by a density-effective stress trend that has been derived using a different multiplier than the velocity-effective stress trend. For example, in tethered mode, the multiplier $\alpha$ is used to determine the velocity-effective stress trend and to determine the multiplier a; the multiplier a is then used to determine the density-effective stress trend. In untethered mode, the multiplier a is not calculated from $\alpha$; rather, they are each chosen by the user or by the program (e.g., in the form of a delimiter).

The term "delimiter," when used herein as a noun is defined as a prescribed minimum or maximum number, amount, or equation. The term delimiter, when used herein as an adjective, is defined as related to a prescribed minimum or maximum number, amount, or equation. A delimiter trend (e.g., delimiter density-velocity trend) may serve as a minimum or maximum equation to be used in estimating formation pressures. A delimiter multiplier may be a number corresponding to a limit, preferably an upper limit, of a number used to calculate estimated formation pressures. A delimiter multiplier for an a value may be a number that is less than 1.25, 1.1, 1.0, 0.9, 0.8, 0.7, 0.6, 0.5, or 0.4.

3. Certain Specific Embodiments

Now, certain specific embodiments of methods, systems, and CRM, are described, which are by no means an exclusive description of the inventions. Other specific embodiments, including those referenced in the drawings, are encompassed by this application and any patent that issues therefrom.

One or more specific embodiments herein includes a method, system, or CRM for providing an estimated formation pressure comprising modifying a first data set to derive a second data set that corresponds to estimated pressures wherein modifying the first data set comprises using a variable matrix factor and a compaction coefficient.

One or more specific embodiments herein includes a method, system, or CRM for providing an estimated formation pressure comprising acquiring a first data set, deriving a minimum set of estimated pressures using at least the first data set, a first multiplier, a first variable matrix factor, and a first compaction coefficient, deriving a maximum set of estimated pressures using the first data set, a second multiplier, a second variable matrix factor, and a second compaction coefficient, deriving a plurality of iterations of estimated pressures using the minimum set of estimated pressures and the maximum set of estimated pressures, and selecting at least one of the iterations of estimated pressures to provide an estimated formation pressure.

One or more specific embodiments herein includes a method, system, or CRM for providing an estimated formation pressure comprising acquiring a sonic data set for a well, acquiring a density data set for the well, deriving a first data set from the sonic data set and deriving a second data set from the density data set, wherein the first data set and the second data set each correspond to estimated pressures and wherein deriving the first data set and the second data set comprises: selecting a multiplier, using the multiplier to derive both a variable matrix factor and a compaction coefficient, and using the variable matrix factor and the compaction coefficient to derive the first data set and the second data set, performing a comparison of the first data set and the second data set, and determining the estimated pressure for one or more depths that corresponds to the actual pressure at those depths based at least in part on the comparison of the first data set and the second data set.

One or more specific embodiments herein includes a method, system, or CRM for providing an estimated formation pressure comprising modifying a first data set to derive a second data set that corresponds to estimated pressures by, wherein modifying the first data set to derive the second data set comprises using a first variable matrix factor and a first compaction coefficient, comparing the second data set with a third data set, recording the pressure or pressure gradient data if the second data set corresponds to the third data set, modifying the first data set to derive a fourth data set that corresponds to estimated pressures, wherein modifying the first data set to derive the fourth data set comprises using a second variable matrix factor and a second compaction coefficient, comparing the fourth data set with the third data set, and recording the pressure data if the fourth data set corresponds to the third data set; wherein: the first variable matrix factor and the first compaction coefficient are derived from a first multiplier and the second variable matrix factor and the second compaction coefficient are derived from a second multiplier.

One or more specific embodiments herein includes a method, system, or CRM for providing an estimated formation pressure comprising acquiring a sonic data set for a well, acquiring a density data set for the well, deriving a minimum set of estimated pressures using the sonic data set, a first variable matrix factor and a first compaction coefficient, deriving a minimum set of estimated pressures using the density data set, the first variable matrix factor and the first compaction coefficient, deriving a maximum set of estimated pressures using the sonic data set, a second variable matrix factor and a second compaction coefficient, deriving a maximum set of estimated pressures using the density data set, the second variable matrix factor and the second compaction coefficient, iteratively deriving one or more intermediate sets of estimated pressures for both the sonic-derived data and the density derived data using both the minimum and maximum sets of estimated pressures, and determining the estimated pressure for one or more depths based on the convergence of one or more of the sonic-derived sets and the density-derived data sets; wherein the first variable matrix factor and the first compaction coefficient are derived from a first multiplier and wherein the second variable matrix factor and the second compaction coefficient are derived from a second multiplier.

One or more specific embodiments herein includes a method, system, or CRM for providing an estimated formation pressure comprising selecting a first multiplier value, using an algorithm comprising the first multiplier value to convert density-depth data and velocity-depth data to first pressure gradient data and second pressure gradient data, comparing the first pressure gradient data with the second pressure gradient data, locking a first portion of the first and second pressure gradient data above the first depth, using the algorithm comprising a second multiplier value to create third pressure gradient data and fourth pressure gradient data corresponding to the density-depth data and the velocity-depth data for depths below the first depth, comparing the third pressure gradient data with the fourth pressure gradient data, and locking a second portion of the third and fourth pressure gradient data above the second depth.

In any one of the methods, systems, or CRM disclosed herein, modifying the first data set may comprise selecting a multiplier and using the multiplier to determine the variable matrix factor and the compaction coefficient.

Any one of the methods, systems, or CRM disclosed herein may further comprise deriving a velocity compaction trend, wherein the velocity compaction trend is calculated from the equation $\Delta t_n = (\Delta t_{ml} - \Delta t_i)e^{-cz} + \Delta t_i$, $\Delta t_i$ is the variable matrix factor, c is the compaction coefficient, $\Delta t_{ml}$ is travel time at a mud line, and z is depth.

Any one of the methods, systems, or CRM disclosed herein may further comprise comparing the second data set with a third data set.

In any one of the methods, systems, or CRM disclosed herein, modifying the first data set may comprise predetermining a first density-velocity trend and a second density-velocity trend, using a multiplier to determine a third density-velocity trend using the first density-velocity trend and the second density-velocity trend, and using the multiplier to derive the variable matrix factor and the compaction coefficient.

In any one of the methods, systems, or CRM disclosed herein, the maximum set of estimated pressures may be determined using a density-velocity trend that is represented by equation $v=4800+2000(\rho-1.3)^{4.2}$, wherein v is velocity and $\rho$ is density.

In any one of the methods, systems, or CRM disclosed herein, the minimum set of estimated pressures may be determined using a density-velocity trend that is represented by equation $v=4900+4500(\rho-1.3)^3$, wherein v is velocity and $\rho$ is density.

In any one of the methods, systems, or CRM disclosed herein, deriving iterations of estimated pressures may comprise utilizing a third multiplier that does not correspond to either the first multiplier or second multiplier.

In any one of the methods, systems, or CRM disclosed herein, the multiplier may be selected by the user.

In any one of the methods, systems, or CRM disclosed herein, the multiplier may range from 0.0 to 1.0.

In any one of the methods, systems, or CRM disclosed herein, the first data set may comprise density-depth data.

In any one of the methods, systems, or CRM disclosed herein, the first data set may comprise sonic-depth data.

In any one of the methods, systems, or CRM disclosed herein, deriving iterations of estimated pressures using the minimum set of estimated pressures and the maximum set of estimated pressures may comprise scrolling a physical or virtual mouse wheel.

In any one of the methods, systems, or CRM disclosed herein, deriving iterations of estimated pressures using the minimum set of estimated pressures and the maximum set of estimated pressures may comprise using only a portion of the well data set.

In any one of the methods, systems, or CRM disclosed herein, deriving iterations of estimated pressures using the minimum set of estimated pressures and the maximum set of estimated pressures may further comprise using multipliers to derive the iterations of estimated pressures.

In any one of the methods, systems, or CRM disclosed herein, the variable matrix factor may be based on the equations $\Delta t_i = \varphi_i(\Delta t_{ml} - \Delta t_{mx}) + \Delta t_{mx}$ and $\varphi_i = -22.7427(\alpha)^3 + 59.2148(\alpha)^2 - 52.6646(\alpha) + 16.294$; wherein $\Delta t_i$ is the variable matrix factor, $\varphi_i$ is irreducible porosity, $\Delta t_{ml}$ is travel time at a mud line, $\Delta t_{mx}$ is travel time through a matrix, and $\alpha$ is a multiplier.

In any one of the methods, systems, or CRM disclosed herein, the compaction coefficient may be based on the equation $c=0.000148393(\alpha)^2 - 0.00000376465(\alpha) + 0.000158341$; wherein c is the compaction coefficient and $\alpha$ is a multiplier.

In any one of the methods, systems, or CRM disclosed herein, modifying the first data set may further comprise using a multiplier to derive a density-velocity trend, wherein the density-velocity trend may be used in modifying the first data set.

One or more specific embodiments herein includes a method, system, or CRM for determining pore pressure, comprising predetermining a first velocity-density trend for a first type of formation, predetermining a second velocity-density trend for a second type of formation, selecting at least a first multiplier value, calculating a velocity compaction trend using the first multiplier value, calculating a density compaction trend using the velocity compaction trend, the velocity-density trend, and the first multiplier value, calculating an overburden using the density compaction trend, calculating an effective stress trend using the overburden and a normal hydrostatic trend, calculating a velocity-effective stress trend using the velocity compaction trend and the effective stress trend, and calculating a density-effective stress trend using the velocity-density trend, the density compaction trend, and the first multiplier value.

In any one of the methods, systems, or CRM disclosed herein, modifying the first data set may comprise predetermining an upper limit and a lower limit for a density-velocity trend using existing well data, selecting a multiplier to calculate a density-velocity trend line, determining a density compaction trend using existing well data, the density-velocity trend line, the variable matrix factor and the compaction coefficient, determining a velocity-effective stress trend using the single density-velocity trend line and the velocity compaction trend, determining a density-effective stress trend, determining a first pressure or pressure gradient using the velocity-effective stress trend, and determining a second pressure or pressure gradient using the density-effective stress trend.

Any one of the methods, systems, or CRM disclosed herein may further comprise unlocking the first portion of the first and second pressure gradient data above the first depth.

In any one of the methods, systems, or CRM disclosed herein, the multiplier may range from 0.0 to 2.0.

In any one of the methods, systems, or CRM disclosed herein, the multiplier may range from 0.0 to a selected upper limit that is below 1.0.

In any one of the methods, systems, or CRM disclosed herein, the third data set may comprise well events at various depths.

In any one of the methods, systems, or CRM disclosed herein, the third data set may comprise mud weight of a well at various depths.

In any one of the methods, systems, or CRM disclosed herein, the first multiplier may be 0.0.

In any one of the methods, systems, or CRM disclosed herein, the second multiplier may be 1.0.

One or more specific embodiments herein includes methods, systems, or CRM for determining pore pressure, comprising: acquiring sonic log data in a well; acquiring density log data in the well; transforming the sonic log data to velocity derived pressures for first and second formation types; transforming the density log data to density derived pressures for the first and second formation types; shifting the velocity derived pressures and density derived pressures while tethered together through iterations between a first state representative of the first formation type and a second state representative of the second formation type; and selecting the pore pressure based on convergence of the velocity derived pressures and density derived pressures during the shifting between the first and second states.

In any one of the methods, systems, or CRM disclosed herein, the first formation type may be smectite and the second formation type may be illite.

In any one of the methods, systems, or CRM disclosed herein, the shifting of the velocity derived pressures and density derived pressures may be performed via scrolling in a computer application.

In any one of the methods, systems, or CRM disclosed herein, the iterations during the shifting of the velocity derived pressures and density derived pressures may be fractional solutions from the first state toward the second state.

In any one of the methods, systems, or CRM disclosed herein, the iterations during the shifting of the velocity derived pressures and density derived pressures may be increments from the first state toward the second state no greater than ten percent of a total difference between the first and second states.

In any one of the methods, systems, or CRM disclosed herein, the iterations may be part of a minimization function with the selecting of the pore pressure thereby automated.

In any one of the methods, systems, or CRM disclosed herein, the iterations during the shifting of the velocity derived pressures and density derived pressures may apply a first fractional solution to solve for a first discrete depth interval and a second fractional solution to solve for a second discrete depth interval.

In any one of the methods, systems, or CRM disclosed herein, the transforming of the sonic log data may be based on a compaction trend defined by: $\Delta t_n = \Delta t_{mx} + (\Delta t_{ml} - \Delta t_i) * e^{-cz} + \Delta t_i$, where $\Delta t_n$ refers to travel time normal; $\Delta t_{mx}$ refers to travel time matrix; $\Delta t_{ml}$ refers to travel time mudline; $\Delta t_i$ is an irreducible porosity compensation factor defined as: $\Delta t_i = \{\varphi_i (\Delta t_{ml} - \Delta t_{mxi})\} - \Delta t_{mx}$; $\varphi_i$ is irreducible porosity; c is a compaction coefficient; and z is depth below mudline.

Any one of the methods, systems, or CRM disclosed herein may further comprise drilling the well while selecting the pore pressure.

Any one of the methods, systems, or CRM disclosed herein may further comprise creating a pore pressure profile for a proposed wellbore based on a correlation to the well.

One or more specific embodiments herein includes a system for determining pore pressure, comprising: a sonic logging tool, a density logging tool, and a computer coupled to receive sonic log data output from the sonic logging tool and density log data output from the density logging tools and configured with a program to determine the pore pressure by: transforming the sonic log data to velocity derived pressures for first and second formation types, transforming the density log data to density derived pressures for the first and second formation types, shifting the velocity derived pressures and density derived pressures while tethered together through iterations between a first state representative of the first formation type and a second state representative of the second formation type, and displaying the pore pressure based on convergence of the velocity derived pressures and density derived pressures during the shifting between the first and second states.

In any one of the methods, systems, or CRM disclosed herein, the iterations may be part of a minimization function implemented by the program to automate the displaying of the pore pressure.

In any one of the methods, systems, or CRM disclosed herein, the sonic logging tool and density logging tool may be coupled to a drill bit for drilling the well while displaying the pore pressure.

In any one of the methods, systems, or CRM disclosed herein, a pore pressure profile may be created for a proposed wellbore based on a correlation to the well.

Any of the methods, systems, or CRM described herein may be performed by a program stored on non-transitory computer-readable media as machine code (e.g., object code).

One or more specific embodiments herein includes methods, systems, or CRM for providing an estimated formation pressure may comprise acquiring a first data set, acquiring a second data set, providing a lower density-velocity trend and an upper density-velocity trend, calculating a delimiter density-velocity trend using a delimiter multiplier, the lower density-velocity trend, and the upper density-velocity trend, wherein the first density velocity trend may be between the lower density-velocity trend and an upper density-velocity trend; receiving a first multiplier and deriving a first density-velocity trend; and calculating estimated pressures using the first density-velocity trend, the first data set, and the second data set; wherein, if the first multiplier is less than the delimiter multiplier, deriving the first density-velocity trend may comprise calculating the first density-velocity trend using the first multiplier, the lower density-velocity trend, and the upper density-velocity trend; and if the first multiplier is equal to or greater than the delimiter multiplier, deriving the first density-velocity trend may comprise calculating the first density-velocity trend using the delimiter multiplier, the lower density-velocity trend, and the upper density-velocity trend.

In any one of the methods, systems, or CRM disclosed herein, the first multiplier may be selected by a user and the delimiter multiplier may either be selected by the user or determined by a program.

Any of the methods, systems, or CRM described herein may further comprise comparing estimated pressures derived from the first data set with pressures derived from mud weight of a drilled well if the first multiplier is greater than or equal to the delimiter multiplier.

Any of the methods, systems, or CRM described herein may further comprise comparing estimated pressures derived from the first data set with estimated pressures derived from the second data set if the first multiplier is less than the delimiter multiplier.

One or more specific embodiments herein includes methods for providing an estimated formation pressure including acquiring a sonic data set for a well; acquiring a density data set for the well; deriving a first data set from the sonic data set and deriving a second data set from the density data set, wherein the first data set and the second data set each correspond to estimated pressures and wherein deriving the first data set and the second data set comprises: selecting a first multiplier and a second multiplier, wherein the second multiplier is not derived from the first multiplier; using the first multiplier or the second multiplier to derive a velocity compaction trend comprising a variable matrix factor and a compaction coefficient; and using the velocity compaction trend and a sonic-density trend to derive the first data set and the second data set; wherein the sonic-density trend is determined by the first multiplier if the first multiplier is below the second multiplier; and wherein the sonic-density trend is determined by the second multiplier if the first multiplier is greater than or equal to the second multiplier.

4. Specific Embodiments in the Figures

The drawings presented herein are for illustrative purposes only do not limit the scope of the claims. Rather, the drawings are intended to help enable one having ordinary skill in the art to make and use the claimed inventions.

This section addresses specific embodiments of the invention shown in the drawings, which relate to methods, systems, and CRM for determining formation pressure(s). Although this discussion focuses on the drawings, and the specific embodiments referenced therein, the discussion may also have applicability to other embodiments not shown in the drawings. However, the limitations referenced in this section should not be used to limit the scope of the claims themselves, which have broader applicability. The sonic and density logging tools referenced in the drawings acquire data transformed by an algorithm that includes normal compaction trends representative of different formation types. Pairing such velocity normal compaction trends and iteratively solving using drilling history, pressure measurements, and known mud weight history trends for the formation types derives a best iterative solution velocity-effective stress trend, which enables direct calculation of the pore fluid pressure for a range of depths. The pore fluid pressure estimation may provide correlations for nearby proposed wells or estimate real-time measurements for selecting mud weight while drilling the well.

Changes in formation properties (e.g., at different depths in a wellbore) may result in predictable changes in velocity-effective stress relationships. For example, chemical conversion of clay from smectite to illite results in a decrease in velocity-effective stress relationships. Embodiments of the inventions include methods that may account for these changes using a single transformative factor (e.g., $\alpha$) selected by the user. Other embodiments of the inventions include methods that may account for these changes using two or three transformative factors (e.g., $\alpha$, and a).

FIG. 1 shows a velocity-density cross-plot with a first (RhoVE-$\epsilon$) curve 100 and a second (RhoVE-S) curve 102. This labeling utilizes abbreviations where Rho or $\rho$ stands for density, V stands for velocity, and E stands for effective stress. As with other plots described herein, the first curve 100 and the second curve 102 provide higher and lower end member curves used to create intermediate solutions shown between the first curve 100 and the second curve 102.

Default relationships and default inputs for the first curve 100 and the second curve 102 were derived from known information about such formations and are thus fixed. For some embodiments, a velocity-density equation is defined by:

$$V = V_0 + A(\rho - \rho_0)^B \quad \text{Equation 1}$$

where aforementioned defaults are set forth in the following table.

| Curve fitting parameters | RhoVE-$\epsilon$ | RhoVE-S |
|---|---|---|
| $V_0$ | 4800 | 4900 |
| A | 2000 | 4500 |
| B | 4.2 | 3 |
| $\rho_0$ | 1.3 | 1.3 |

Two independent, transformative factors ($\alpha$, a) may be used iteratively to convert sonic and density measurements into estimates of effective stress and pore pressure. Alternatively, the two transformative factors ($\alpha$, a) may be dependent, such that one (a) is calculated from the other ($\alpha$). For example a may be calculated from $\alpha$ using:

$$a = \gamma \alpha - \alpha^\gamma \quad \text{Equation 2}$$

Gamma ($\gamma$) may be an arbitrary, variable empirical curve fitting parameter. Additional information regarding the $\gamma$ term may be found in the discussion of FIG. 10 (below). $\alpha$, which may be determined by the user, represents an arbitrary input parameter that preferably ranges between 0.0 and 1.0. Embodiments where the $\alpha$ and a terms are independent may be referred to herein as "untethered" modes. Embodiments where the a term is dependent on the $\alpha$ term may be referred to herein as "tethered" modes. Each mode is discussed in greater detail below.

In some embodiments, the two bounding end-member curves (RhoVE-S and RhoVE-$\epsilon$) are used to determine intermediate (fractional) solutions of velocity-effective stress and density-effective stress relationships. Each of the intermediate solutions may be determined using a single parameter a, which may be supplied by the user (untethered) or calculated from the $\alpha$ value (tethered). The intermediate curves may be determined using the following equation:

$$\text{Intermediate curve} = a*(RhoVE\text{-}\epsilon - RhoVE\text{-}S) + RhoVE\text{-}S \quad \text{Equation 3}$$

These intermediate curves may be used to produce velocity-effective stress and density-effective stress relationships, as described below.

Figure 2:
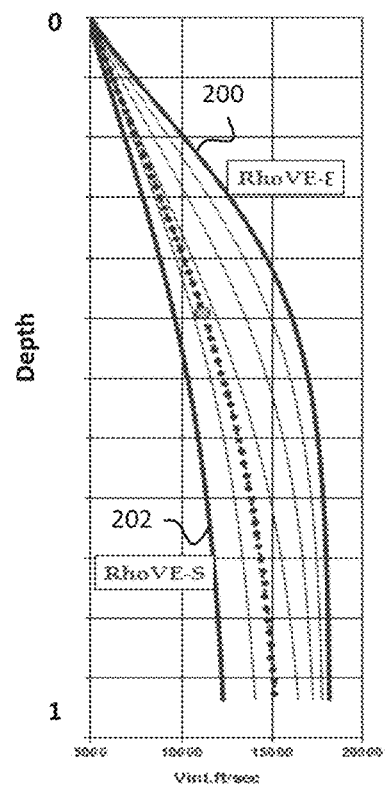
FIG. 2 depicts a plot of velocity normal compaction trends, according to one or more specific embodiments of the inventions.

FIG. 2 illustrates a plot of a series of velocity normal compaction trends including an upper velocity 200 representative of a first formation type and a lower velocity 202 representative of a second formation type. In some embodiments, the velocity trends derive from:

$$\Delta t_n = (\Delta t_{ml} - \Delta t_i)e^{-cz} + \Delta t_i \quad \text{Equation 4}$$

where $\Delta t_n$ refers to transit time at normal compaction condition, provided the transit time is always a function of velocity; $\Delta t_{ml}$ refers to transit time at the mudline (e.g., 200 microseconds per foot); $\Delta t_i$ is an irreducible porosity compensation factor defined as:

$$\Delta t_i = \varphi_i(\Delta t_{ml} - \Delta t_{mx}) + \Delta t_{mx} \quad \text{Equation 5}$$

$\Delta t_i$ may be used as a non-zero lower bound travel time value that varies depending by formation type. $\varphi_i$ is irreducible porosity (e.g., from 0 to 16% between RhoVE-$\epsilon$ and RhoVE-S) and related to the fractional RhoVE curve sharing the same $\alpha$ value (e.g., 0.0-1.0) through the mathematical expression:

$$\varphi_i = -22.7427*(\alpha)^3 + 59.2148*(\alpha)^2 - 52.6646*\alpha + 16.294;$$

c is a compaction coefficient (e.g., from 0.00016 to 0.00030 between RhoVE-$\epsilon$ and RhoVE-S) and related to the fractional RhoVE curve sharing the same $\alpha$ value (0.0-1.0) through the mathematical expression:

$$c = 0.000148393*(\alpha)^2 - 0.00000376465*\alpha + 0.000158341;$$

$\Delta t_{mx}$ refers to transit time at the matrix (e.g., 55 microseconds per foot); and z is depth below the mudline. The compaction coefficient and the irreducible porosity terms provide fractional solutions between trends for the upper velocity 200 and the lower velocity 202 when differing α values (e.g., 0.0-1.0) are used. The equations for determining irreducible porosity and the compaction coefficient were iteratively solved using trial-and-error methods by plotting the series trends versus alpha (α) against multiple offset well pore pressure interpretations from the deep water Gulf of Mexico and other basins. After establishing the functional trends, both of these data sets were regressed with a polynomial function versus alpha (α) input ranging between 0.0 and 1.0.

In embodiments utilizing the "tethered" mode, all RhoVE-S and RhoVE-ϵ end-member bounding curves in each of the derived graphs are preferably "tethered" for each combination of velocity, density, and effective stress calculations and coincident for all α input values. The tethered mode may require that all model calculations are performed together using a common variable, preferably α.

Intermediate curves shown in FIG. 2 represent 0.2 incremental contour values. The end-member RhoVE-S and RhoVE-ϵ bounding end-member velocity-depth trend lines, and intermediate contours calculated using a are converted to density-depth RhoVE-S and RhoVE-ϵ compaction trends and intermediate contours by convolving each discrete contour with their respective sonic—density counterparts having corresponding α values.

Figure 3:
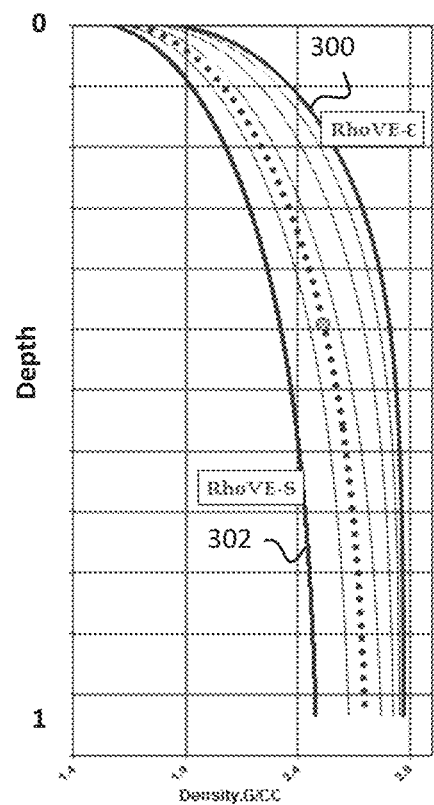
FIG. 3 depicts a plot of density normal compaction trends, according to one or more specific embodiments of the inventions.

FIG. 3 shows a plot of density normal compaction trends including an upper density trend 300 representative of a first formation type and a lower density trend 302 representative of a second formation type. The density trends relate to, and are thus also calculable from, the velocity-density cross-plot shown in FIG. 1 and the velocity trends shown in FIG. 2. In other words, the trends for the upper velocity 200 and the upper density 300 when cross plotted provide the first curve (100, FIG. 1).

Figure 4:
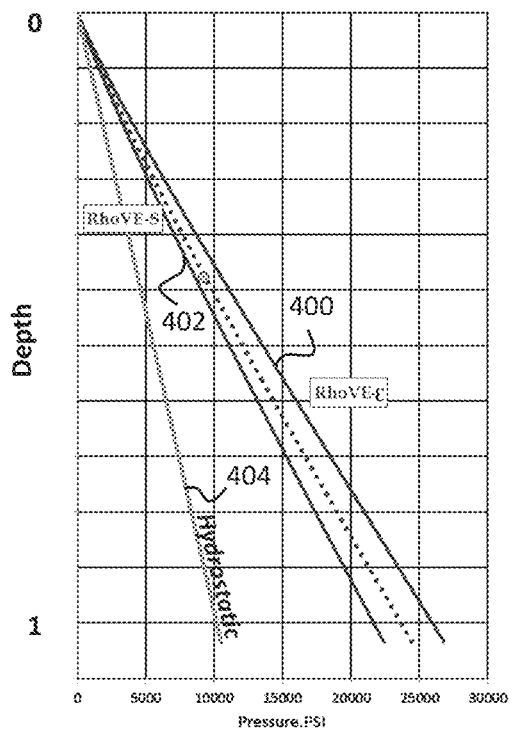
FIG. 4 depicts a plot of overburden pressure and hydrostatic pressure versus depth, according to one or more specific embodiments of the inventions.

FIG. 4 illustrates a plot of RhoVE-S and RhoVE-ϵ end member integration product overburden curves and intermediate fractional solution overburden pressure curve plotted along with a single hydrostatic pressure 404 versus depth. Differences between the hydrostatic pressure 404 and the range of overburden pressure curves provide the normal effective stress ranges used in the set of velocity-effective stress curves and density-effective stress curves shown in FIGS. 5 and 6. Integrating the density normal compaction trend profile provides the overburden pressures, which thus change based on such density as shown by a higher overburden 400 representative of a first formation type and a lower overburden 402 representative of a second formation type. Hydrostatic pressure 404 may be determined by the addition of a water density profile or water gradient and may be input as a variable to match offset well local salinity conditions.

Figure 5:
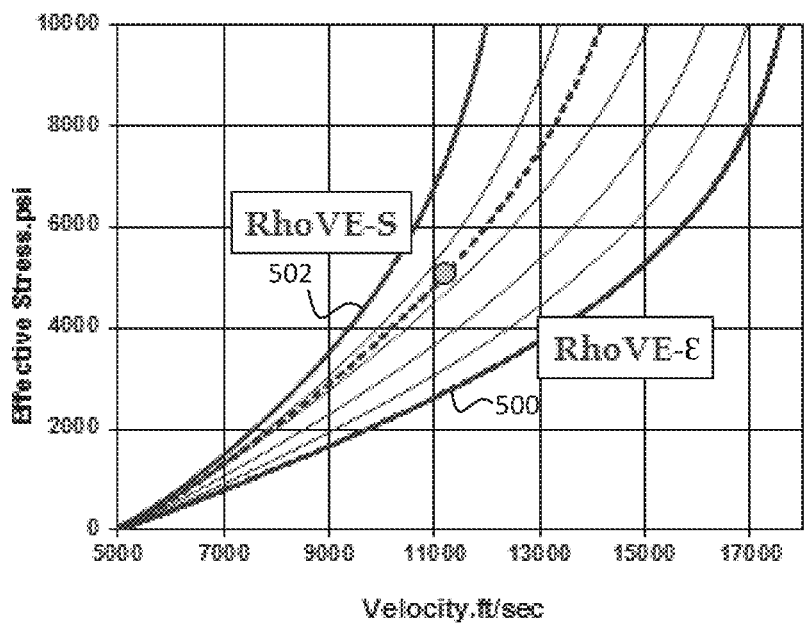
FIG. 5 depicts integration-derived velocity-effective stress curves, according to one or more specific embodiments of the inventions.

FIG. 5 shows velocity-effective stress trends including a lower effective stress curve 500 representative of a first formation type (RhoVE-ϵ) and an upper effective stress curve 502 representative of a second formation type (RhoVE-S). Data from FIGS. 2 and 4 enable determination of the depicted velocity-effective stress curves. Effective stress may be calculated using the equation:

$$\sigma_{ES}=\sigma_V-pp \qquad \text{Equation 6}$$

where pp is the pore pressure, $\sigma_V$ is the vertical stress (overburden) and $\sigma_{ES}$ is the vertical effective stress. Given that the pore pressure is a function of measured/actual effective stress in comparison to the theoretical normal effective stress, calculations for the pore pressure may apply the velocity-effective stress curves. Velocity-effective stress contours may change with different salinity inputs for hydrostatic pressure (404, FIG. 4).

Figure 6:
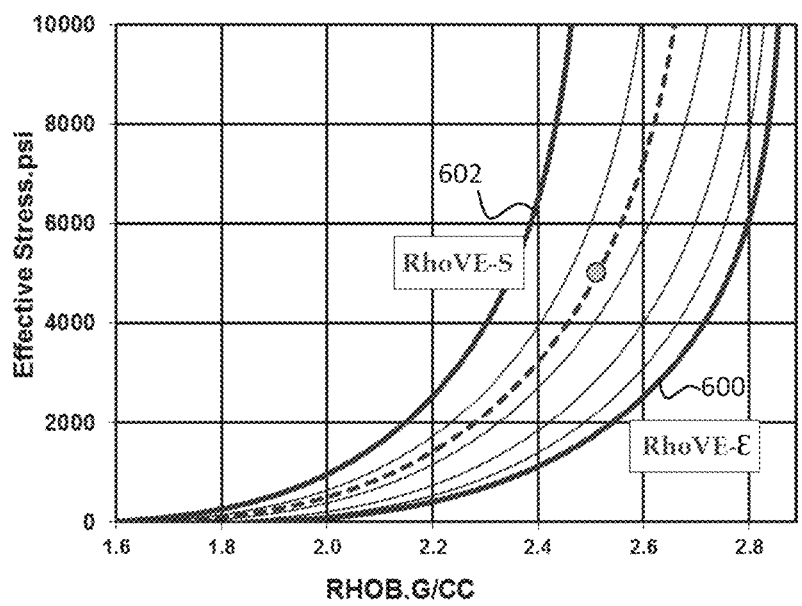
FIG. 6 depicts integration-derived density-effective stress curves, according to one or more specific embodiments of the inventions.

FIG. 6 illustrates density-effective stress trends including a lower density-based stress curve 600 representative of a first formation type (RhoVE-ϵ) and an upper density-based stress curve 602 representative of a second formation type (RhoVE-S). A similar transformation used for the velocity-effective stress curves may be used to create the density-effective stress trends. Further, transformation of density log data to pressure may be performed by applying the density-effective stress curves.

For all the curves in FIGS. 1-6, fractional solutions result from moving from a first state referred to as 0.0 for the RhoVE-S representation toward a second state referred to as 1.0 for the RhoVE-ϵ representation. For example, with respect to FIG. 5, the upper effective stress curve 502 defines the 0.0 iteration while the lower effective stress curve 500 forms the 1.0 iteration. Performing calculations in some embodiments as described further herein relies on iterating the a value between the 0.0 and 1.0.

α inputs lock down and are thus tethered together such that these iterations move together between the states 0.0 and 1.0. For example, the dotted lines in each of the FIGS. 1-6 may correspond to the iteration for 0.3 with other like iterations also shown between the bounds described in 0.2 intervals. In some embodiments, the iterations shown by the intermediate contours shift in increments from the first state toward the second state preferably no greater than twenty percent of a total difference between the first and second states.

Figure 7:
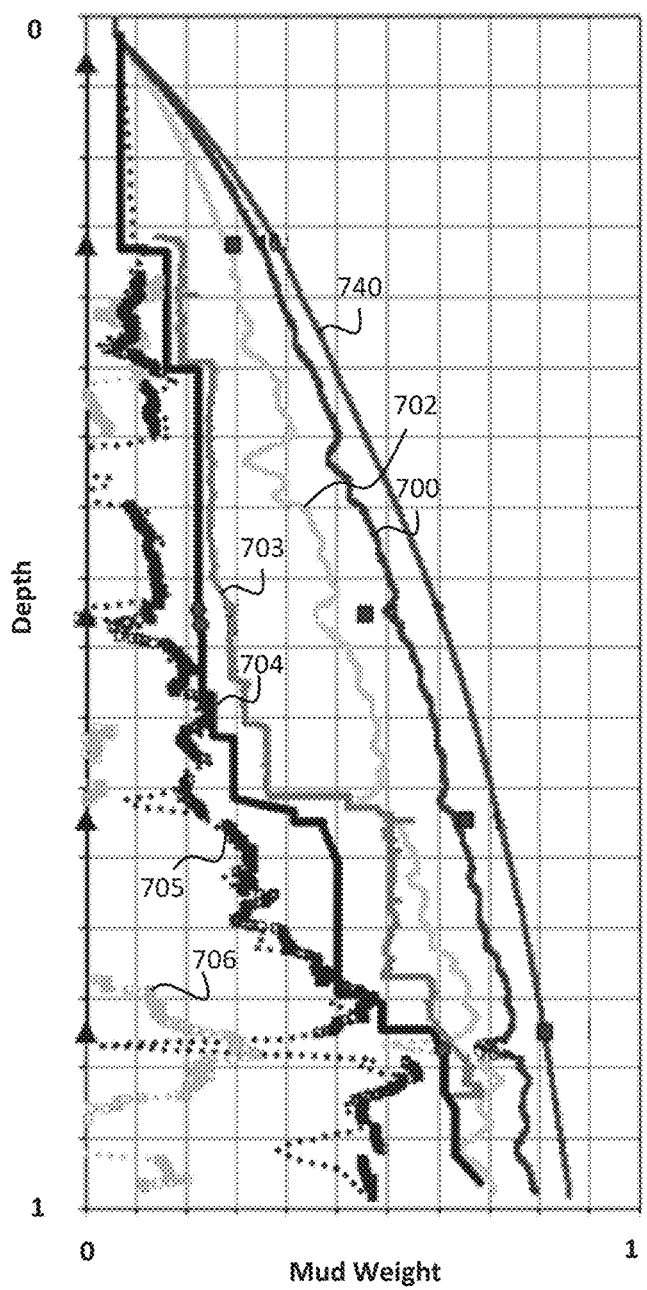
FIG. 7 depicts sonic and density log data each transformed to a pore pressure estimate and plotted with other curves, such as mud weight, according to one or more specific embodiments of the inventions.

FIG. 7 shows a well pressure plot with a calculated overburden pressure 740 using density log data acquired from a density logging tool. For user reference, the plot further includes a shale fracture gradient 700, a sand fracture gradient 702, equivalent circulating mud density 703 and mud weight 704. Various historically documented well drilling events, such as stuck drill pipe and kick (not shown on the plot) provided verification of the results described herein. While labeled based on mud weight to be selected for use in the well, the plot provides the pore pressure information as a function of the mud weight.

Sonic log data is transformed to velocity-derived pressures 705 utilizing aforementioned trends (i.e. starting with Equation 2 using the irreducible porosity and compaction coefficient terms set for RhoVE-S). A similar transformation of the density log data provides density-derived pressures 706. In application, these transformations provide a starting point of 0.0 for the iterations that follow.

FIGS. 8A, 8B, 8C and 8D illustrate how the pore pressure is determined using the iterations applying fractional solutions (i.e., from RhoVE-S to RhoVE-ϵ) for the transformed data in FIG. 7. The sonic and density log data input on the velocity-density cross-plot shown in FIG. 8A include several clusters corresponding to various depths in the well where formation properties change. In particular, the data shown plotted with respect to a first curve 800 and a second curve 802 includes the clusters at a first interval 811, a second interval 812, a third interval 813 and a fourth interval 814.

Figure 8A:
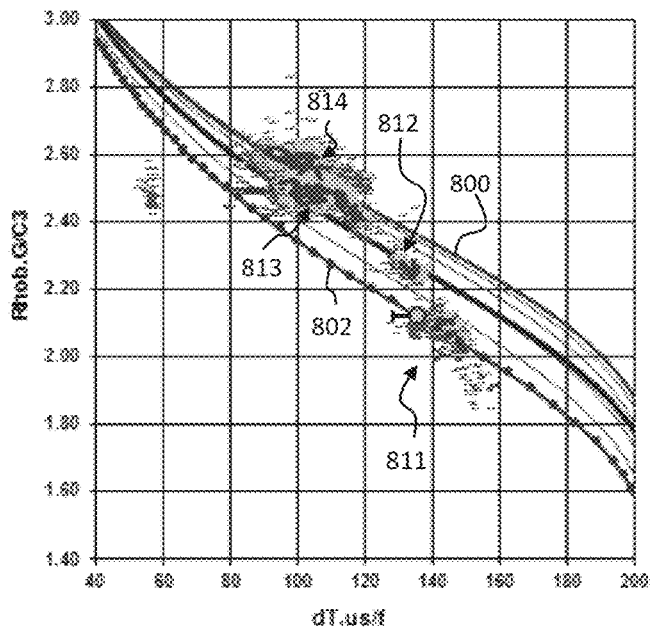
FIGS. 8A-8D depict iterations applying fractional solutions-for the pressure data in FIG. 7 with pore pressure being solved for discrete depth intervals by visual convergence of the curves from the sonic and density logs, according to one or more specific embodiments of the inventions.
Figure 8B:
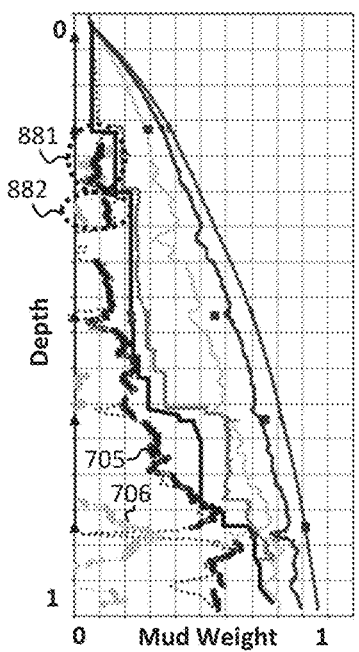
Figure 8C:
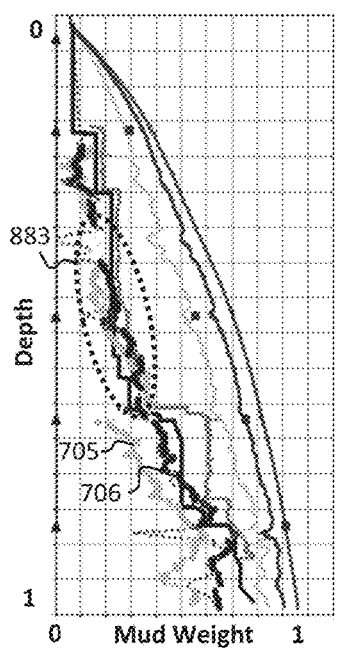
Figure 8D:
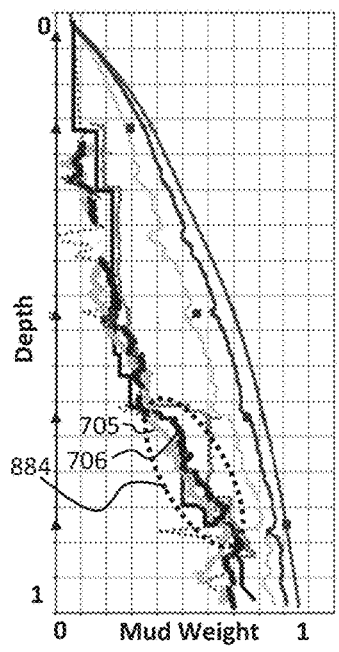

The well pressure plots in the FIGS. 8B, 8C and 8D include the velocity- and density-derived pressures 705, 706 at respective successive iterations for 0.0, 0.5 and 0.7. Solving for the pore pressure occurs where the velocity- and density-derived pressures 705, 706 converge as is visible on these plots. The first, second, third, and fourth intervals 811,

812, 813, 814 visible in the FIG. 8A correspond to respective first, second, third, and fourth convergence intervals 881, 882, 883, 884 identified by dashed circles in the FIGS. 8B, 8C and 8D.

In operation, at least a portion of the velocity- and density-derived pressures 705, 706 are locked down once aligned, and deeper intervals of the velocity- and density-derived pressures 705, 706 continue to go through the iterations. For example, the first convergence interval 881 locks down at 0.0 since already aligned. Between the 0.0 iteration and the 0.5 iteration, the second convergence interval 882 sets at 0.33, which is the determined fractional solution between 0.0 (RhoVE-S) and 1.0 (RhoVE-$\epsilon$).

Once at the 0.5 iteration in the FIG. 8C, another portion of the velocity- and density-derived pressures 705, 706 align for the third convergence interval 883, and that portion is locked at these determined pore pressures prior to proceeding to align for the velocity- and density-derived pressures 705, 706 at lower well depths where the velocity- and density-derived pressures 705, 706 are still separated from one another. The fourth convergence interval 884 aligns at the 0.7 iteration in FIG. 8D. A curve formed in FIG. 8D by where the velocity- and density-derived pressures 705, 706 converged provides the pore pressure profile throughout the depth of the well. At any point in this process, a user may unlock one or more portions of the convergence of the velocity- and density-derived pressures 705, 706 and once more iterate that portion through various fractional solutions. For example, the velocity- and density-derived pressures 705, 706 may have converged together to provide similar estimated pressures, yet those estimated pressures may not correspond to the pressure indicated by the mud weight or other pressure indicators. In this case, it would be beneficial to be able to shift the estimated pressures together, and this can be done by using the same sonic-density trend that provided the converged pressure estimates using either the untethered mode or delimiter, as described below.

In some embodiments, the velocity- and density-derived pressures 705, 706 in deeper sections of the well need not rely on such convergence for determination of the pore pressure and may be decoupled from the foregoing approach and determined separately. This situation occurs when the convergence indicates an estimated pore pressure that differs from a known pore pressure based on well events, such as a kick. The iterations may thus continue until velocity- or density-derived pressures 705, 706 reach the known pore pressure even though past where the convergence occurred while iterating.

Figure 9:
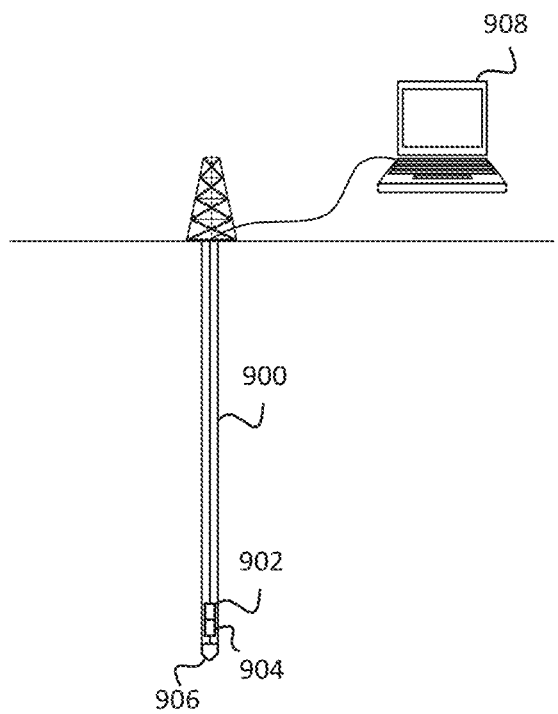
FIG. 9 depicts a system with sonic and density logging tools coupled with data outputs to a computer configured to estimate pore pressure, according to one or more specific embodiments of the inventions.

FIG. 9 shows a system for determining pore pressure in a well 900. The system includes a sonic-logging tool 902 and a density-logging tool 904 disposed in the well 900 proximate a drill bit 906. In some embodiments, the logging tools 902, 904 run on wireline in the well 900 during operations separate from drilling. Computer 908 is coupled, preferably wirelessly, to receive data output from the logging tools 902, 904 and is configured with a program to determine the estimated pore pressure throughout the well 900 using the data and techniques described herein.

For some embodiments, a minimization function automates the selecting of the estimated pore pressure. The program implemented by the computer 908 may thus include the iterations as part of the minimization function. In some embodiments, shifting of the velocity- and density-derived pressures 705, 706 through the iterations occurs via scrolling, such as with a mouse wheel or touch slider, in the program implemented by the computer 908.

Figure 10:
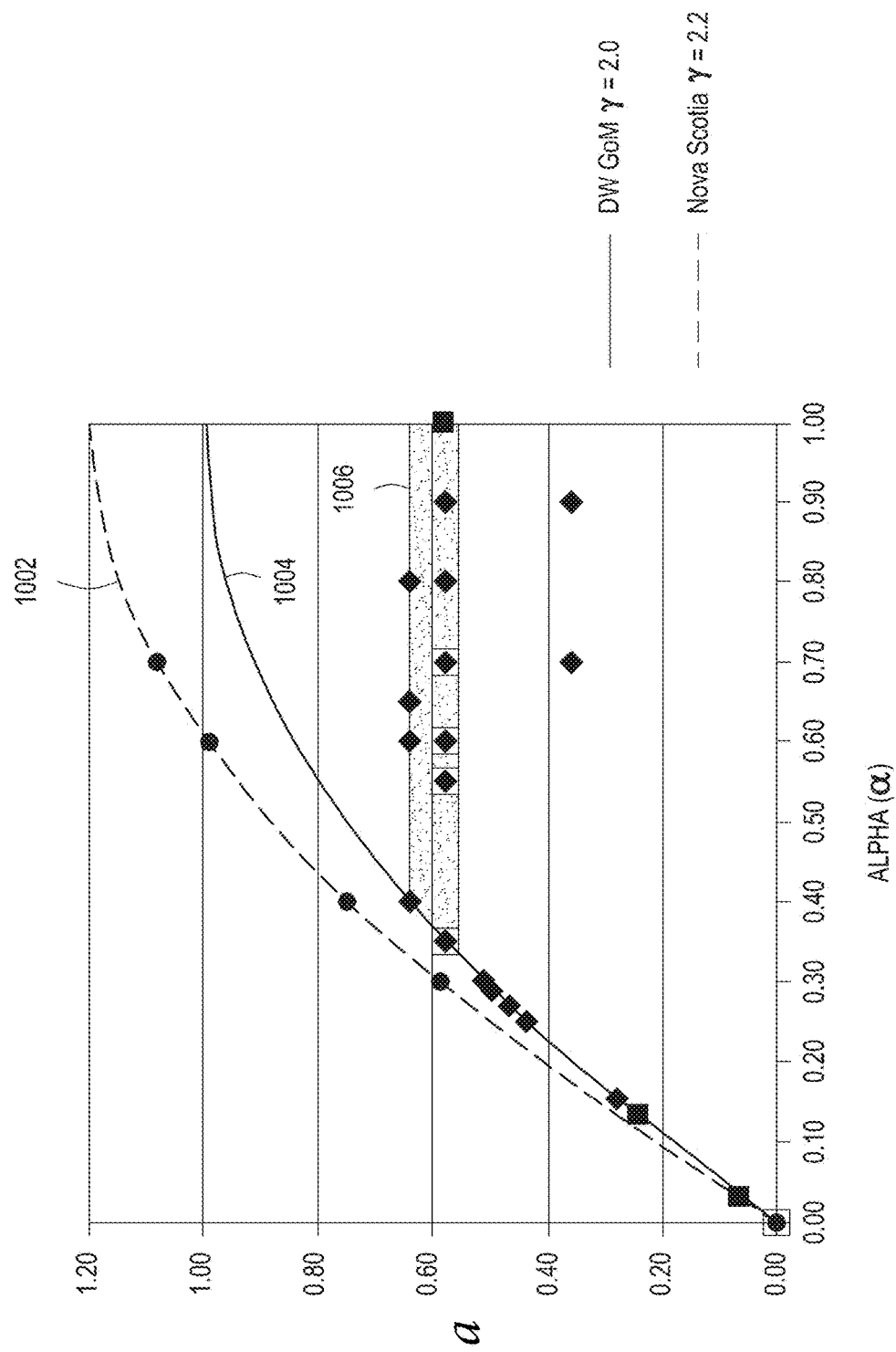
FIG. 10 depicts at least one example of a relationship between multiplier values a and alpha ($\alpha$) when differing gamma ($\gamma$) values are chosen.

FIG. 10 shows a plot of a values calculated from $\alpha$ using various $\gamma$ values. As discussed above, a values are calculated from $\alpha$ values through the equation: $a=\gamma\alpha-\alpha^{\gamma}$. The $\gamma$ term may be an arbitrary, variable empirical curve fitting parameter. $\gamma$ may be found by iteratively fitting untethered a-$\alpha$ pairs calibrated to known well pore pressure and velocity-density data from existing wells. $\alpha$ versus a cross-plot for deep water Gulf of Mexico (DWGOM) data 1004 using $\gamma=2.0$, and offshore Nova Scotia data 1002 using $\gamma=2.2$. Shaded region 1006 depicts empirically-derived $\alpha$ vs. a upper limit for the DWGOM data. Well control for the DWGOM areas demonstrate an upper trend maximum limit 1006 for the a-term calibration of sonic-density cross-plot relationships for alpha ($\alpha$) values of between 0.35-0.4. Modifications to $\gamma$ may stretch the sonic-density cross-plot contours and related calculations to accommodate variations in rock properties of other sedimentary basins, including variations in travel time due to clay weight percent as well as other changes in fine-grained rock fabric. It is also contemplated that the $\gamma$ term may be used to account for differences in sediment source provenance, clay type, age of sediments, or potentially an increase or decrease in the weight percent of clay within the shales.

In some embodiments, during tethered mode, an upper ceiling delimiter may be used to cap the sonic-density trend to a maximum threshold value. Establishment of the delimiter, or upper threshold in sonic-density cross-plot space is based on analyzing sub-regional trends, and/or local offset well calibration for a sedimentary basin or sub-regional area within a basin, such as those analyzed above. Calculations involving velocity-depth and density-depth compaction trends using $\beta$ continue as before to produce velocity-effective stress and density-effective stress trends. The delimiter may be used to set an upper level a value for determining which sonic-density trend to use when calculating estimated pressures. As the user increases the $\alpha$ value upwards from 0.0 (e.g., by scrolling upward), the a value may be calculated from the $\alpha$ value using the formula described above as in the tether mode. When the user reaches the delimiter (for example, where a =0.7), the a value may remain at 0.7, while the $\alpha$ value continues to increase as the user continues scrolling upward. This results in a shift in the velocity- and density-effective stress trends, as seen in FIG. 11. A delimiter may be used regardless of the $\gamma$ value used to calculate a from $\alpha$. Users may find that the best-fit delimiter increases with increasing $\gamma$ values, and, in some cases, the delimiter for the $\alpha$ value may exist at the same $\alpha$ value regardless of the $\gamma$ value. For example, the delimiter value of 0.6 for a may be selected as a best-fit when $\gamma$ is 2.0, which corresponds to an $\beta$ value of about 0.37; a delimiter value of 0.7 for a may be selected as a best-fit when $\gamma$ is 2.2, which also corresponds to an $\alpha$ value of about 0.37. The delimiter may correspond to a point at which the chemical composition of the clay does not change (e.g., convert from smectite to illite) substantially. Pressure estimates using an $\beta$ value that correspond to an a value beyond the delimiter may account for changes primarily due to unloading of the formation, as no significant chemical alteration of the clay is expected beyond this point. For some basins or wells, it may be preferable not to utilize a delimiter in calculating estimated pressures (e.g., in the Nova Scotia well described above). The selected upper limit of the delimiter (or the choice not to use a delimiter at all) may be guided by changes in rock properties and/or clay content in the well at issue.

The primary calibration data used to determine $\gamma$ for the northern Atlantic was the Chevron (CVX) H-23 Newburn well located offshore Nova Scotia. Calibration for the H-23 well suggests for that for offshore regions of Nova Scotia, $\gamma=2.2$, and there is no need to set an upper limit. This 10% stretch factor, beyond the observed relationship for the DWGOM ($\gamma=2.0$), may be attributed to changes in formation properties as described above. Certain embodiments herein are applicable to varying shale lithologies with multiple segmented normal compaction trends.

Figure 11A:
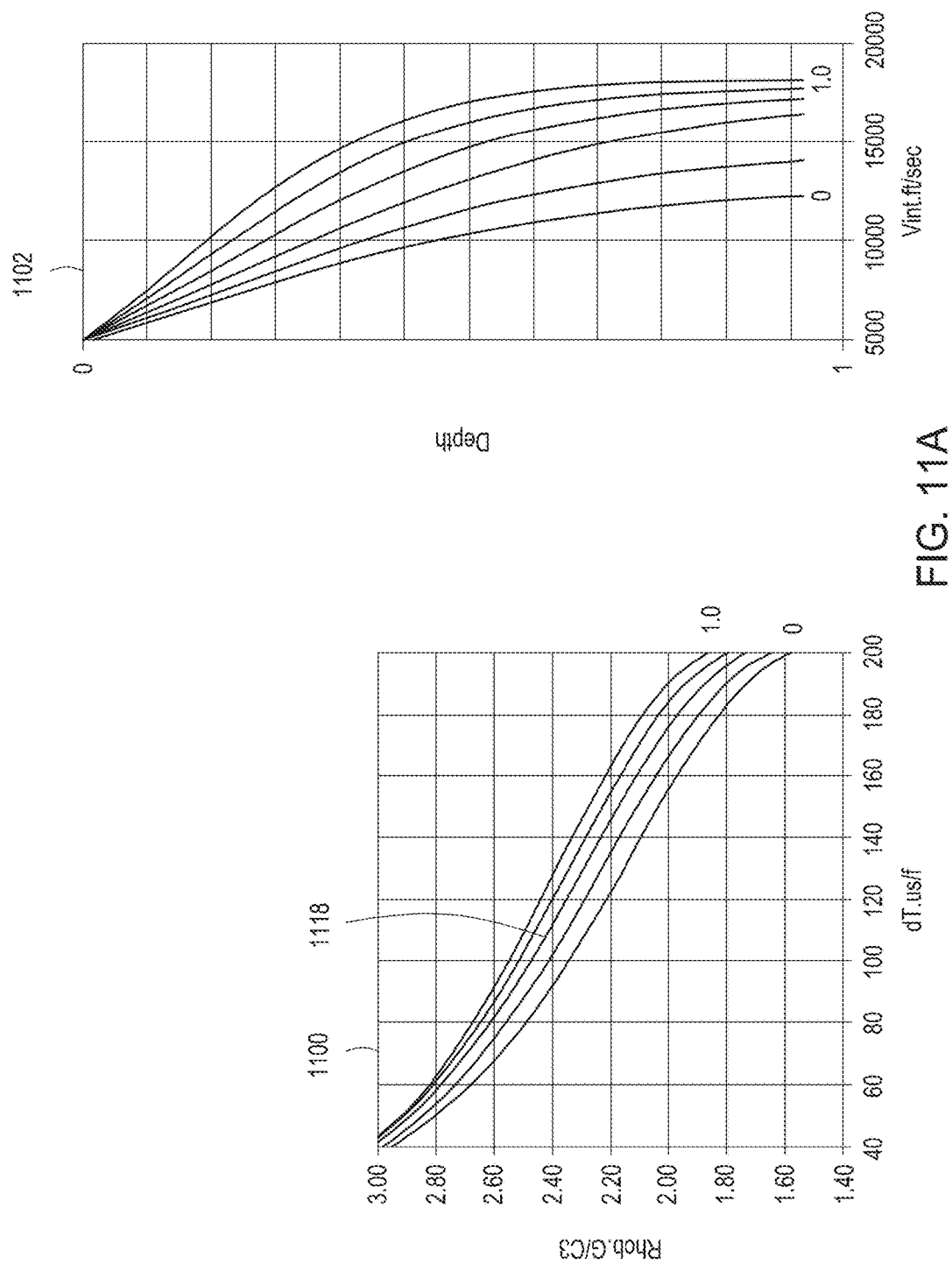
Figure 11C:
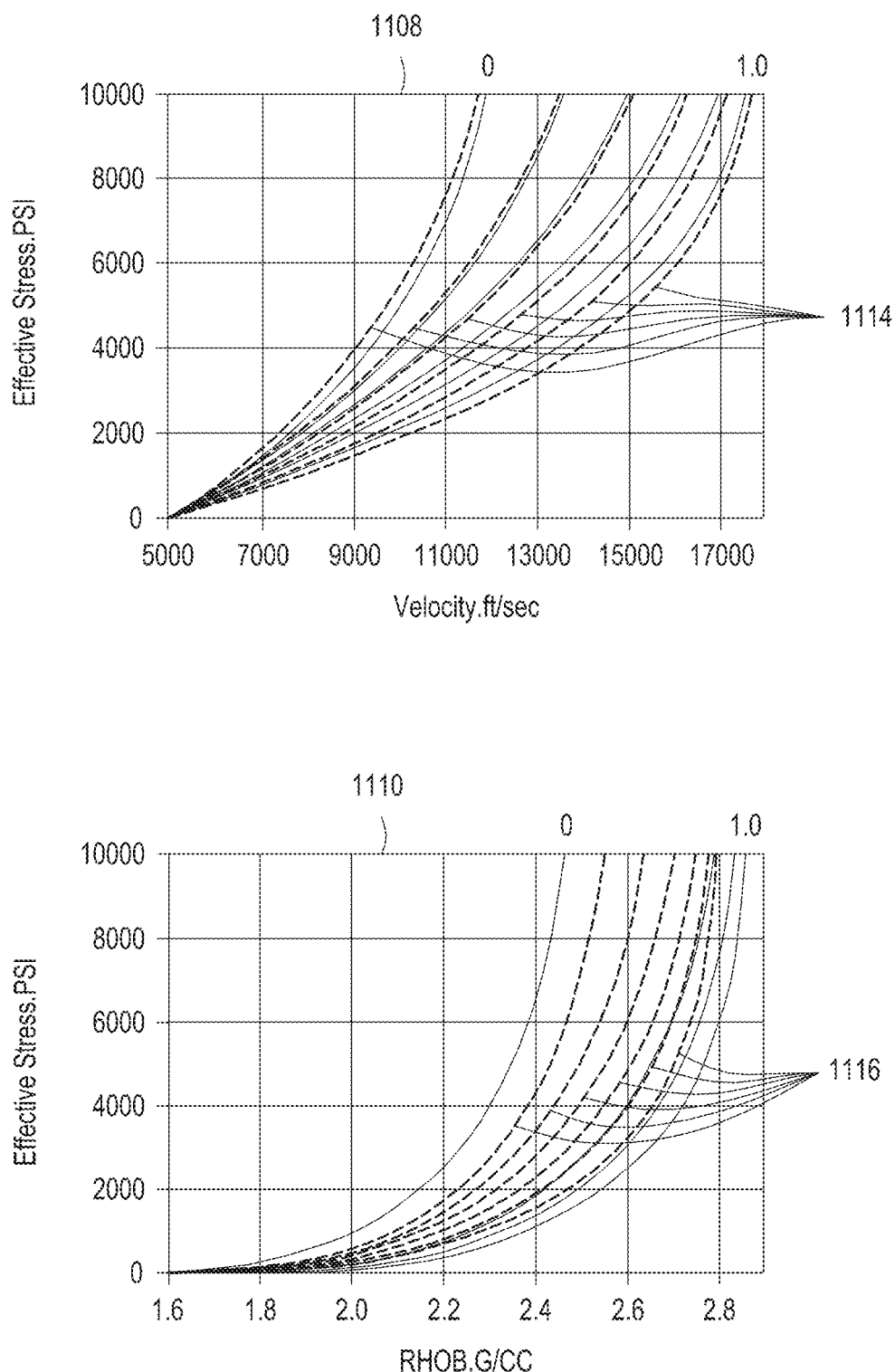

FIGS. 11A-11C illustrate the difference between the "tethered" and "untethered" modes. In the "untethered" mode, the sonic-density relationship is locked for a discrete sonic-density best-fit trend that may pass through sonic-density wireline data in cross-plot, when available. The velocity compaction trends may be worked independently in the same manner until convergence of the transformed sonic and density pore pressure estimates is calibrated to drilling history indicators. In the "untethered" mode, a preferred sonic-density trend may be selected by the user, and the calculation of a is decoupled from the α value provided by the user that is applied to the velocity-depth compaction series; the user now scrolls through a range of α values while using a single a value (i.e., a single sonic-density trend). Convolving velocity normal compaction trends with a single sonic-density relationship produced the set of dashed pattern trend curves 1112, 1114, 1116 observed on density compaction trends and other cross-plots displayed also for incremental contour values of 0.2.

If sonic and density log data are available, during "untethered" mode, the a value may be found by choosing the best match of iteratively determined smoothed shale velocity-density picks. When velocity-density data are not available, a and α may be simultaneously found by iteratively searching for the best match of well pore pressure data. For example, initial a/α value(s) is chosen, pore pressures are computed from sonic log shale picks using the velocity-effective stress look-up table and an overburden stress curve computed from actual formation density data; if pore pressure estimates are consistent with calibration data, the process is complete; if not, process is repeated until agreement is reached.

In an example of a "delimiter mode," described above, i.e., a method, system or CRM in which a delimiter is used, a combination of tethered and untethered modes is used. An upper limit of a is selected, either by the user, the program, or both. This upper limit may be determined using offset well data, or well data from wells sharing similar characteristics with the well at issue. The user may scroll through a series of α values, from which a values are calculated up until the a value reaches some value, e.g., the pre-selected upper limit. Once this upper limit is reached, calculations of pressure estimates using α values above the corresponding upper limit of a may now be determined using that single a value (the upper limit). In at least one embodiment, the use of the delimiter results in generation of pressure estimates using the tethered mode up until a reaches the delimiter, and values above this delimiter are generated using the untethered mode with the single a value, or as many untethered a values as are required to complete pressure estimations.

The pore pressure determinations described herein provide interactive solutions with limited operator input and without long delays from difficult calculations. As a result of the speed at which the pore pressure determinations can be made, drilling the well may occur while determining the pore pressure in real time. Some embodiments create a pore pressure profile for a proposed wellbore based on a correlation to a nearby existing well having the pore pressure determined as described herein. For example, a subsequent wellbore may rely on the determined iteration values from an initial well for direct application of the corresponding velocity-effective stress trend to sonic logging data taken in the subsequent wellbore. A best-fit velocity-effective stress and density-effective stress solution, with uncertainty ranges, can thus be developed for particular ages/intervals, and then applied to undrilled locations with similar age and sedimentation histories.

5. Additional Specific Embodiments

Embodiments of the invention relate to systems and methods for determining pore fluid pressure of a formation through which a well traverses for recovery of hydrocarbons. Sonic and density logging tools acquire data that is transformed by an algorithm that includes normal compaction trends representative of different formation types, such as smectite and illite used herein by example. Pairing such velocity-depth normal compaction trends and iteratively solving using drilling history, pressure measurements and known mud weight history trends for the formation types derives a best iterative solution velocity-effective stress trend, which enables direct calculation of the pore fluid pressure. The pore fluid pressure determination may provide correlations for nearby proposed wells or real-time measurements for selecting mud weight while drilling the well.

FIG. 1 shows a velocity-density cross-plot with a theoretical illite (RhoVE-I) curve 100 and a theoretical smectite (RhoVE-S) curve 102. This labeling utilizes abbreviations where Rho or ρ stands for density, V stands for velocity, E stands for effective stress, I stands for the illite and S stands for smectite. Measurements of sonic travel time, dT in units of microseconds per foot, equate to the quotient of $10^6$ divided by velocity. As with other plots described herein, the theoretical illite curve 100 and the theoretical smectite curve 102 provide maximum and minimum bounds for mixed layer solutions shown between the illite curve 100 and the smectite curve 102.

Default relationships and default inputs for the theoretical illite curve 100 and the theoretical smectite curve 102 derive from known information about such formations and are thus fixed. For some embodiments, a velocity-density equation provides the cross density plot and is defined by:

$$V = V_0 + A(\rho - \rho_0)^B \qquad \text{Equation 1}$$

where aforementioned defaults are set forth in the following table.

| Curve fitting parameters | RhoVE-I | RhoVE-S |
|---|---|---|
| $V_0$ | 4800 | 4900 |
| A | 2000 | 4500 |
| B | 4.2 | 3 |
| $\rho_0$ | 1.3 | 1.3 |

FIG. 2 illustrates a plot of a series of velocity normal compaction trends including an upper velocity 200 representative of illite and a lower velocity 202 representative of smectite. In some embodiments, the velocity trends derive from:

$$\Delta t_n = \Delta t_{mx} + (\Delta t_{ml} - \Delta t_i)e^{-cz} + \Delta t_i \qquad \text{Equation 2}$$

where $\Delta t_n$ refers to transit time at normal compaction condition, provided the transit time is always a function of velocity; $\Delta t_{mx}$ refers to transit time at the matrix (e.g., 55 microseconds per foot); $\Delta t_{ml}$ refers to transit time at the mudline (e.g., 200 microseconds per foot); $\Delta t_i$ is an irreducible porosity compensation factor defined as:

$$\Delta t_i = \{\varphi_i(\Delta t_{ml} - \Delta t_{mxi})\} - \Delta t_{mx} \qquad \text{Equation 3}$$

$\varphi_i$ is irreducible porosity (e.g., from 0 to 16% between RhoVE-I and RhoVE-S) and related to the fractional RhoVE input: (0.0-1.0) through the mathematical expression $\varphi_i = -22.7427*(RhoVE)^3 + 59.2148*(RhoVE)^2 - 52.6646*RhoVE + 16.294$); c is a compaction coefficient (e.g., from 0.00016 to 0.00030 between RhoVE-I and RhoVE-S) and related to the fractional RhoVE input: (0.0-1.0) through the mathematical expression $c = 0.000148393*(RhoVE)^2 - 0.00000376465*RhoVE + 0.000158341$); and z is depth below the mudline. A range of values for the compaction coefficient and the irreducible porosity terms provide the separation and fractional solutions between trends for the upper velocity 200 and the lower velocity 202.

FIG. 3 shows a plot of density normal compaction trends versus depth including an upper density 300 representative of illite and a lower density 302 representative of smectite. The density trends relate to, and are thus also calculable from, the velocity-density cross-plot shown in FIG. 1 and the velocity trends shown in FIG. 2. In other words, the trends for the upper velocity 200 and the upper density 300 when cross plotted provide the illite curve 100.

FIG. 4 illustrates a plot of smectite and illite end member integration product overburden curves and an intermediate fractional solution overburden pressure curve plotted along with a single hydrostatic pressure 404 versus depth curve. Differences between the hydrostatic pressure 404 and the range of overburden pressure curves provides the normal effective stress ranges used in the set of velocity-effective stress curves and density-effective stress curves shown in FIGS. 5 and 6. Integrating the normal compaction trend density profile over the range of smectite and illite over depth ranges provides the overburden pressures, which thus changes based on such density as shown by a high overburden 400 representative of illite and a minimum overburden 402 representative of smectite, and the intermediate ranges thereof.

FIG. 5 shows velocity-effective stress trend curves again including a lower effective stress curve 500 representative of illite and an upper effective stress curve 502 representative of smectite. Data from FIGS. 2 and 4 enable transformation to the velocity-effective stress curves. Given that pore pressure is a function of measured/actual effective stress in comparison to the theoretical normal effective stress, calculations for the pore pressure may apply the velocity-effective stress curves.

FIG. 6 illustrates density-effective stress trend curves also including a lower density based stress curve 600 representative of illite and an upper density based stress curve 602 representative of smectite. A similar transformation used for the velocity-effective stress curves may create the density-effective stress trend curves. Further, transformation of density log data to pressure may apply the density-effective stress curves.

For all the curves in FIGS. 1-6, fractional solutions result in moving from a first state referred to as 0 for the smectite representation toward a second state referred to as 1 for the illite representation. By example with respect to FIG. 5, the upper effective stress curve 502 defines the 0 iteration while the lower effective stress 500 forms the 1 iteration. Performing calculations in some embodiments as described further herein relies on iterating between the 0 and 1.

Compaction coefficients and inputs lock down and are thus tethered together such that these iterations move together between the states. For example, the dotted lines in each of the FIGS. 1-6 may correspond to the iteration for 0.3 with other like iterations also shown between the bounds described. In some embodiments, the iterations shown by the intermediate contours shift in increments from the first state toward the second state no greater than twenty percent of a total difference between the first and second states.

FIG. 7 shows a well pressure plot with a calculated overburden pressure 740 using density log data acquired from a density logging tool. For typical references, the plot further includes a shale fracture gradient 700, a sand fracture gradient 702, equivalent circulating density 703 and mud weight 704. Various historically documented well drilling events, such as stuck drill pipe and kick, not shown on the plot provided verification of the results described herein. While labeled based on mud weight to be selected for use in the well, the plot provides the pore pressure since also possible to express as a function of pressure instead of the mud weight.

A sonic logging tool acquired sonic log data transformed to velocity derived pressures 705 utilizing aforementioned trends (i.e. starting with Equation 2 using the irreducible porosity and compaction coefficient terms set for RhoVE-S). A similar transformation of the density log data provided density derived pressures 706. In application, these transformations provide a starting point of zero for the iterations that follow.

FIGS. 8A, 8B, 8C and 8D illustrate how the pore pressure is determined with the iterations applying fractional solutions (i.e., from RhoVE-S to RhoVE-I) for the transformed data in the FIG. 7. The sonic and density log data input on the velocity-density cross-plot shown in the FIG. 8A include several clusters corresponding to various depths in the well where formation properties change. In particular, the data shown plotted with respect to an illite curve 800 and a smectite curve 802 includes the clusters at a first interval 811, a second interval 812, a third interval 813 and a fourth interval 814.

The well pressure plots in the FIGS. 8B, 8C and 8D include the velocity and density derived pressures 705, 706 at respective successive iterations for 0.0, 0.5 and 0.7. Solving for the pore pressure occurs where the velocity and density derived pressures 705, 706 converge as is visible on these plots. The first, second, third and fourth intervals 811, 812, 813, 814 visible in the FIG. 8A correspond to respective first, second, third and fourth convergence intervals 881, 882, 883, 884 identified by dashed circles in the FIGS. 8B, 8C and 8D.

In operation, the velocity and density derived pressures 705, 706 lock down once aligned with deeper intervals of the velocity and density derived pressures 705, 706 continuing to go through the iterations. For example, the first convergence interval 881 locks down at 0.0 since already aligned. Between the 0.0 iteration and the 0.5 iteration, the second convergence interval 882 sets at 0.33, which is the determined fractional solution between 0.0 or RhoVE-S and 1.0 or RhoVE-I.

Once at the 0.5 iteration in the FIG. 8C, the velocity and density derived pressures 705, 706 align for the third convergence interval 883 and are locked at these determined pore pressures prior to proceeding to get alignment for the velocity and density derived pressures 705, 706 at lower well depths where the velocity and density derived pressures 705, 706 are still separated from one another. The fourth convergence interval 884 aligns at the 0.7 iteration in the FIG. 8D. A curve formed in the FIG. 8D by where the velocity and density derived pressures 705, 706 converged provides the pore pressure profile throughout the depth of the well.

In some embodiments, the velocity and density derived pressures 705, 706 corresponding to a deepest section of the well may not rely on such convergence for determination of the pore pressure and may be decoupled from the foregoing approach for working separate. This situation occurs when the convergence indicates an estimated pore pressure differs from the known pore pressure based on the well events, such as a kick. For defining the formation type, the iterations may thus continue until velocity and density derived pressures 705, 706 reach the known pore pressure even though past where the convergence occurred while iterating.

FIG. 9 shows a system for determining pore pressure in a well 900. The system includes a sonic logging tool 902 and a density logging tool 904 disposed in the well 900 proximate a drill bit 906. In some embodiments, the logging tools 902, 904 run on wireline in the well 900 during operations separate from drilling. Computer 908 couples to receive data output from the logging tools 902, 904 and is configured with a program to determine the pore pressure throughout the well 900 using the data and techniques described herein with respect to FIGS. 1-8.

For some embodiments, a minimization function automates the selecting of the pore pressure. The program implemented by the computer 908 may thus include the iterations as part of the minimization function. In some embodiments, shifting of the velocity and density derived pressures 705, 706 through the iterations occurs via scrolling, such as with a mouse wheel or touch slider, in the program implemented by the computer 908.

The pore pressure determinations described herein provide interactive solutions with limited operator input and without long delays from difficult calculations. As a result of the speed at which the pore pressure determinations can be made, drilling the well may occur while determining the pore pressure in real time. Some embodiments create a pore pressure profile for a proposed wellbore based on a correlation to a nearby existing well having the pore pressure determined as described herein. For example, a subsequent wellbore may rely on the determined iteration values from an initial well for direct application of the corresponding velocity-effective stress trend to sonic logging data taken in the subsequent wellbore.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

Figure 12:
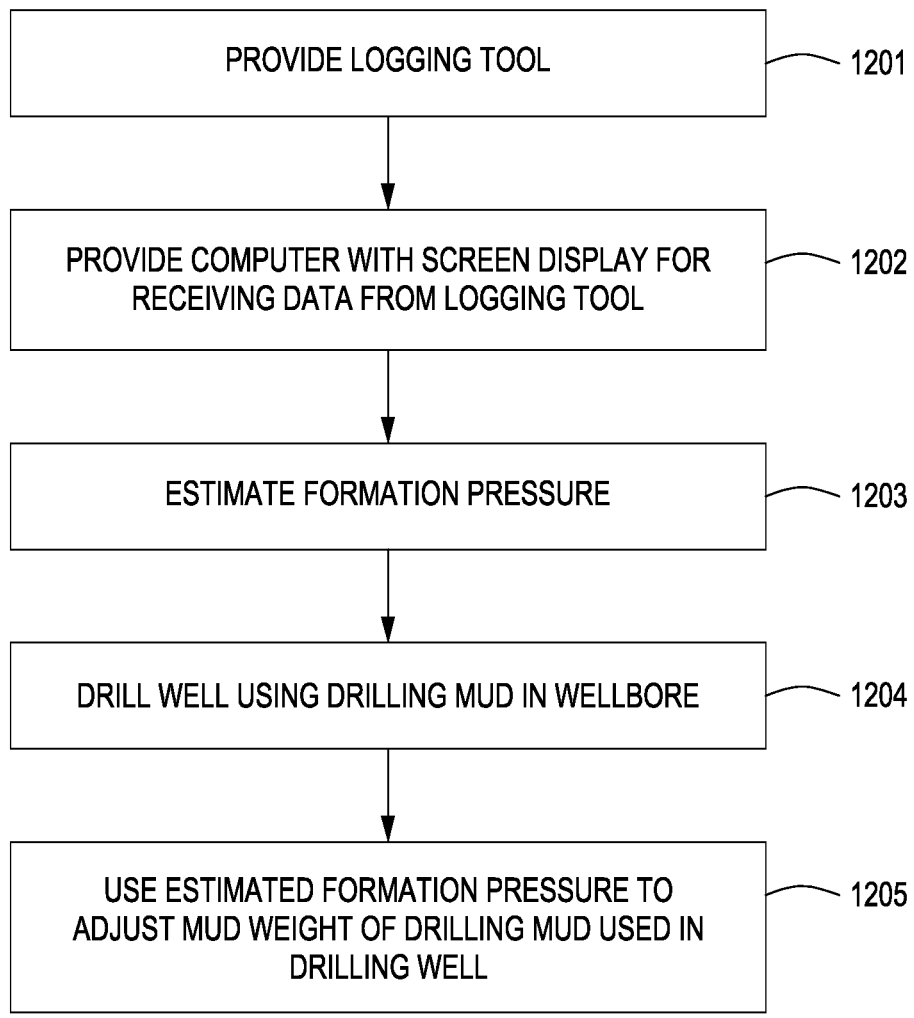
FIGS. 12, 13, 14, 15A and 15B are flow charts depicting examples of drilling methods disclosed in greater detail herein.
Figure 13:
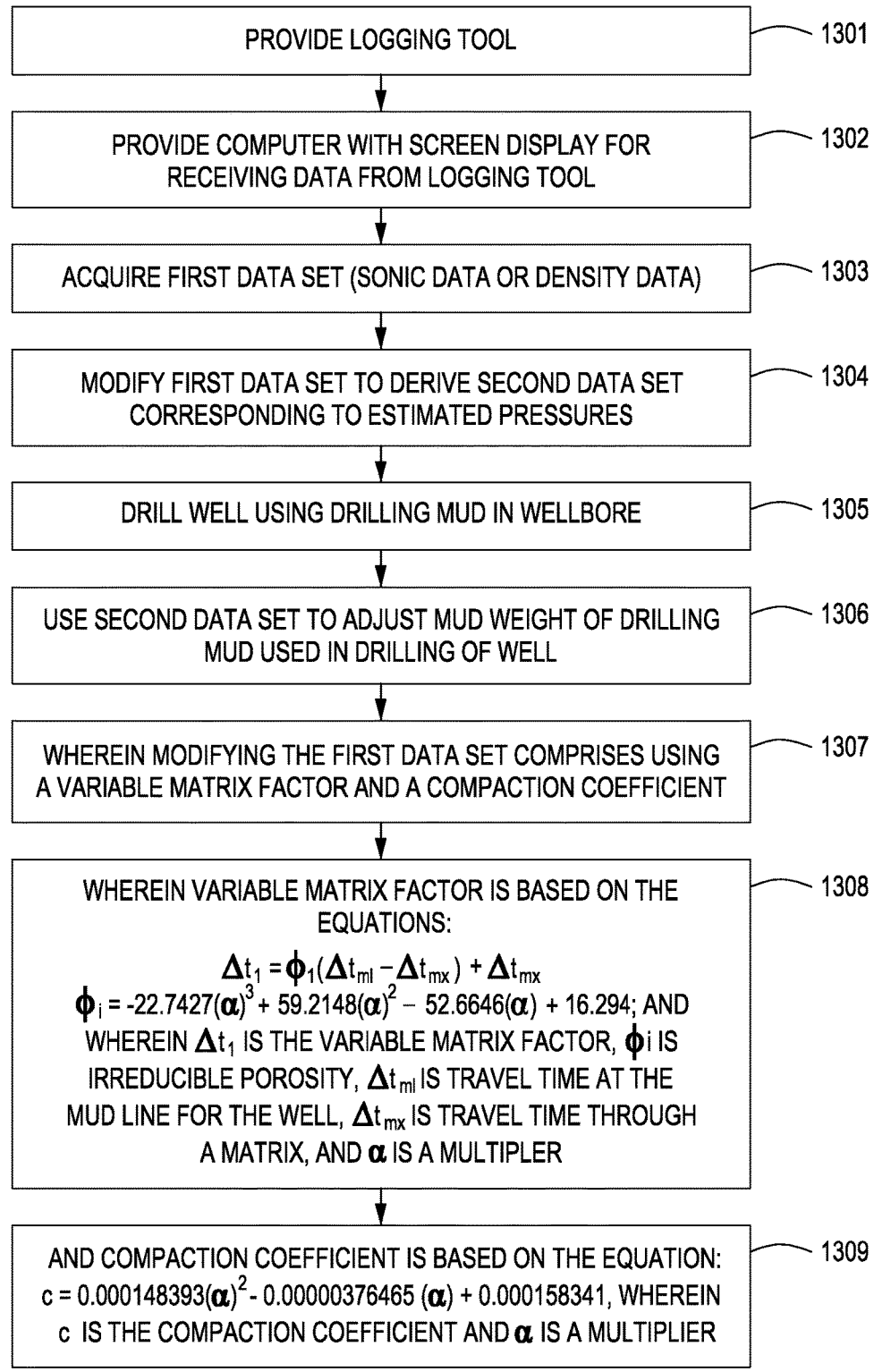
Figure 14:
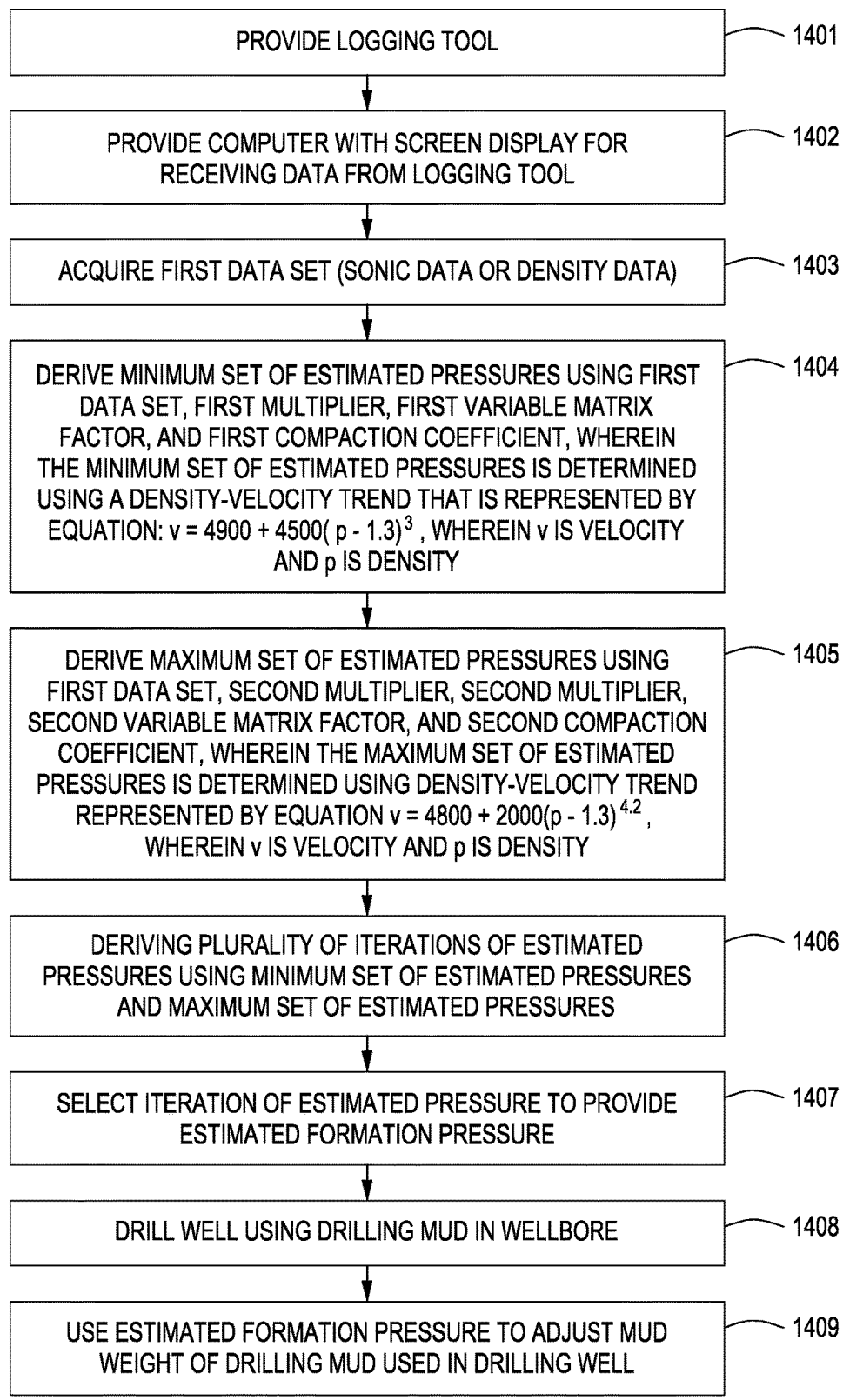

Referring now to FIG. 12, a method of drilling a well is depicted which includes the steps of 1201 providing a logging tool; 1202 providing a computer with a screen display for receiving data from the logging tool; 1203 estimating formation pressure; 1204 drilling the well using drilling mud in the wellbore; and 1205 using estimated formation pressure to adjust the mud weight of the drilling mud used in drilling the well, FIG. 13 depicts a method of drilling a well which includes the steps of 1301 providing a logging tool; 1302 providing a computer with a screen display for receiving data from the logging tool; 1303 acquiring a first data set (sonic data or density data); 1304 modifying the first data set to derive a second data set corresponding to estimated pressures; 1305 drilling the well using drilling mud in the wellbore; 1306 using the second data set to adjust the mud weight of the drilling mud used in drilling of the well, wherein 1307 modifying the first data set comprises using a variable matrix factor and a compaction coefficient, wherein 1308 the variable matrix factor is based on the equations $\Delta t_i = \varphi_i(\Delta t_{ml} - \Delta t_{mx})\Delta t_{mx}$ and $\varphi_i = -22.7427(\alpha)^3 + 59.2148(\alpha)^2 - 52.6646(\alpha) + 16.294$, wherein $\Delta t_i$ is the variable matrix factor, $\varphi_i$ is irreducible porosity, $\Delta t_{ml}$ is travel time at the mud line for the well, $\Delta t_{mx}$ is travel time through a matrix, and $\alpha$ is a multiplier, and wherein 1309 the compaction coefficient is based on the equation: $c = 0.000148393(\alpha)^2 - 0.00000376465(\alpha) + 0.000158341$; 1309 wherein c is the compaction coefficient and $\alpha$ is a multiplier, FIG. 14 depicts a method of drilling a well which includes the steps of 1401 providing a logging tool; 1402 providing a computer with a screen display for receiving data from the logging tool; 1403 providing a first data set (sonic data or density data); 1404 deriving a minimum set of estimated pressures using the first data set, a first multiplier, a first variable matrix factor, and a first compaction coefficient, wherein the minimum set of estimated pressures is determined using a density-velocity trend that is represented by equation: $v = 4900 + 4500(\rho - 1.3)^3$, wherein v is velocity and $\rho$ is density; 1405 deriving a maximum set of estimated pressures using the first data set, a second multiplier, a second variable matrix factor, and a second compaction coefficient, wherein the maximum set of estimated pressures is determined using a density-velocity trend represented by the equation $v = 4800 + 2000(\rho - 1.3)^{4.2}$, wherein v is velocity and $\rho$ is density; 1406 deriving a plurality of iterations of estimated pressures using the minimum set of estimated pressures and the maximum set of estimated pressures; 1407 selecting an iteration of estimated pressures to provide an estimated formation. pressure; 1408 drilling a well using drilling mud in the wellbore; and 1409 using the estimated formation pressure to adjust the mud weight of the drilling mud used in drilling the well.

Figure 15A:
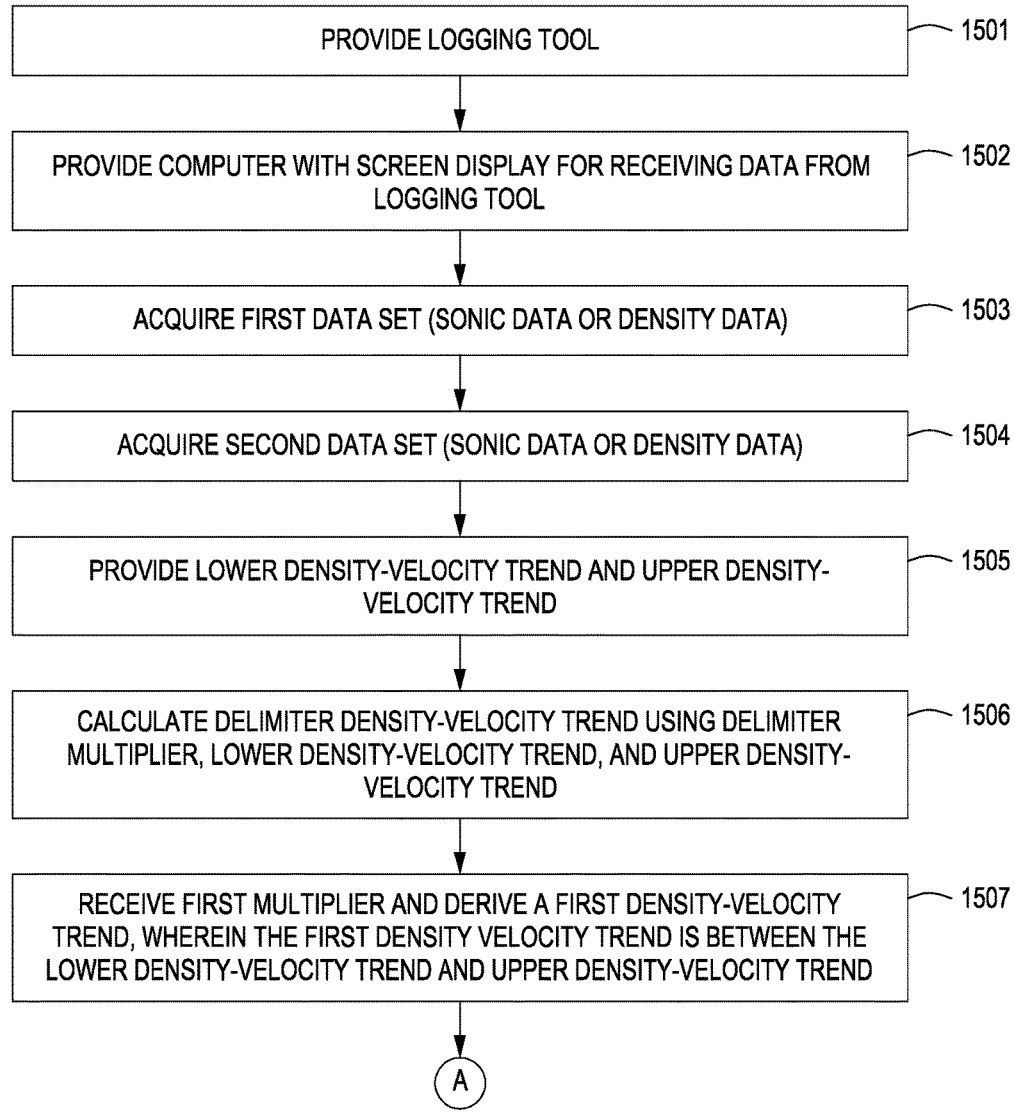
Figure 15B:
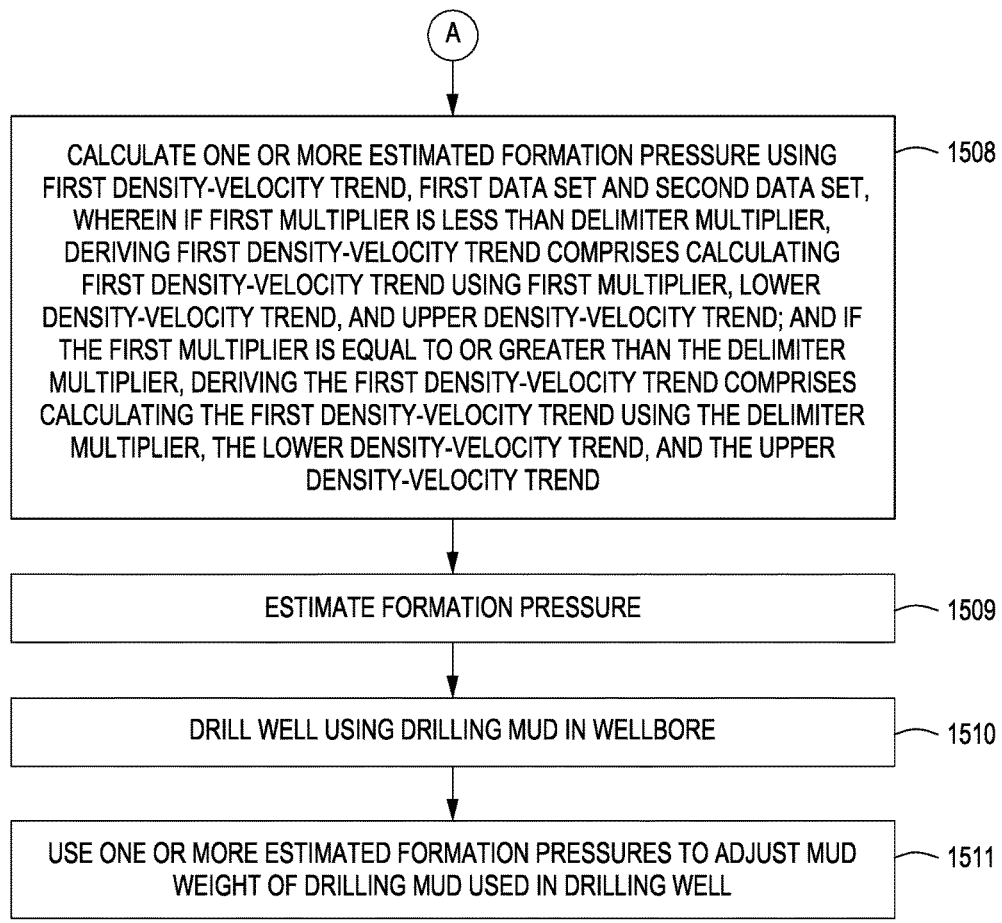

FIGS. 15A and 15B depict a method of drilling a well which includes the steps of 1501 providing a logging tool; 1502 providing a computer with a screen display for receiving data from the logging tool; 1503 acquiring a first data set (sonic data or density data); 1504 acquiring a second data set (sonic data or density data); 1505 providing a lower density-velocity trend and an upper density-velocity trend; 1506 calculating a delimiter density-velocity trend using a delimiter multiplier, the lower density-velocity trend, and the upper density-velocity trend; 1507 receiving a first multiplier and deriving a first density-velocity trend, wherein the first density velocity trend is between the lower density-velocity trend and the upper density-velocity trend; 1508 calculating one or more estimated formation pressures using the first density-velocity trend, the first data set and the second data set, wherein if the first multiplier is less than the delimiter multiplier, deriving first density-velocity trend comprises calculating first density-velocity trend using the first multiplier, lower density-velocity trend, and upper density-velocity trend; and if the first multiplier is equal to or greater than the delimiter multiplier, deriving the first density-velocity trend comprises calculating the first density-velocity trend using the delimiter multiplier, the lower density-velocity trend, and the upper density-velocity trend; 1509 estimating formation pressure; 1510 drilling the well using drilling mud in the wellbore; and 1511 using the one or more estimated formation pressures to adjust the mud weight of the drilling mud used in drilling the well.

What is claimed as the invention is:

1. A method for drilling a well using an estimated formation pressure, comprising:
   providing a logging tool selected from the group consisting of sonic-logging tools, and density-logging tools;
   providing a computer configured to receive data from the logging tool and having a display screen;
   inputting into the computer a first data set acquired from the logging tool and selected from the group consisting of sonic data and density data;
   deriving, using the computer, a minimum set of estimated pressures using at least the first data set, a first multiplier, a first variable matrix factor, and a first compaction coefficient;
   deriving, using the computer, a maximum set of estimated pressures using the first data set, a second multiplier, a second variable matrix factor, and a second compaction coefficient;
   deriving, using the computer, a plurality of iterations of estimated pressures using the minimum set of estimated pressures and the maximum set of estimated pressures;
   selecting at least one of the iterations of estimated pressures;
   providing an estimated formation pressure using the selected iteration of estimated pressures;
   drilling the well using drilling mud in the wellbore having a mud weight; and
   using the selected estimated formation pressure to adjust the mud weight of the drilling mud used in the drilling of the well,
   wherein the maximum set of estimated pressures is determined using a density-velocity trend that is represented by equation:

$v = 4800 + 200(p-1.3)^{4.2}$, and wherein v is velocity and p is density.

2. A method for drilling a well using an estimated formation pressure comprising:
   providing a logging tool selected from the group consisting of sonic-logging tools, and density-logging tools;
   providing a computer configured to receive data from the logging tool and having a display screen;
   inputting into the computer a first data set acquired from the logging tool and selected from the group consisting of sonic data and density data;
   deriving, using the computer, a minimum set of estimated pressures using at least the first data set, a first multiplier, a first variable matrix factor, and a first compaction coefficient;
   deriving, using the computer, a maximum set of estimated pressures using the first data set, a second multiplier, a second variable matrix factor, and a second compaction coefficient;
   deriving, using the computer, a plurality of iterations of estimated pressures using the minimum set of estimated pressures and the maximum set of estimated pressures;
   selecting at least one of the iterations of estimated pressures;
   providing an estimated formation pressure using the selected iteration of estimated pressures;
   drilling the well using drilling mud in the wellbore having a mud weight; and
   using the selected estimated formation pressure to adjust the mud weight of the drilling mud used in the drilling of the well,
   wherein the minimum set of estimated pressures is determined using a density-velocity trend that is represented by equations:

$v = 4900 + 4500(p-1.3)^3$, and wherein v is velocity and p is density.

* * * * *